United States Patent
Moriai

(10) Patent No.: US 7,243,242 B2
(45) Date of Patent: Jul. 10, 2007

(54) DATA TERMINAL DEVICE CAPABLE OF CONTINUING TO DOWNLOAD ENCRYPTED CONTENT DATA AND A LICENSE OR REPRODUCE ENCRYPTED CONTENT DATA WITH ITS CASING IN THE FORM OF A SHELL CLOSED

(75) Inventor: Shinsuke Moriai, Inuyama (JP)

(73) Assignee: Sanyon Electric Co., Ltd., Moriguchi-shi (JP)

( * ) Notice: Subject to any disclaimer, the term of this patent is extended or adjusted under 35 U.S.C. 154(b) by 1023 days.

(21) Appl. No.: 09/931,858

(22) Filed: Aug. 20, 2001

(65) Prior Publication Data

US 2002/0035692 A1   Mar. 21, 2002

(30) Foreign Application Priority Data

Sep. 21, 2000   (JP) .............................. 2000-286582

(51) Int. Cl.
*G06F 1/00* (2006.01)
(52) U.S. Cl. ...................................... 713/300; 713/323
(58) Field of Classification Search ................ 713/300, 713/320
See application file for complete search history.

(56) References Cited

U.S. PATENT DOCUMENTS

| | | | | |
|---|---|---|---|---|
| 5,845,137 A | * | 12/1998 | Tanaka ........................ | 713/323 |
| 5,996,078 A | * | 11/1999 | Christensen et al. ........ | 713/300 |
| 6,044,473 A | * | 3/2000 | Kim ............................ | 713/320 |
| 6,285,406 B1 | * | 9/2001 | Brusky ........................ | 348/552 |
| 6,289,452 B1 | * | 9/2001 | Arnold et al. ............... | 713/175 |
| 6,331,865 B1 | * | 12/2001 | Sachs et al. ................. | 715/776 |

* cited by examiner

*Primary Examiner*—Kambiz Zand
*Assistant Examiner*—Christopher J. Brown
(74) *Attorney, Agent, or Firm*—Westerman, Hattori, Daniels & Adrian, LLP.

(57) ABSTRACT

A cellular phone in the form of a shell downloads and reproduces encrypted content data distributed from a distribution server. The cellular phone includes a detection unit detecting whether its casing in the form of the shell is open/closed. If with the cellular phone currently downloading or reproducing encrypted content data its casing in the form of the shell is closed, a controller controls a power supply unit to supply power required for completing the download process or the reproduction process. Thus if the casing is closed the cellular phone still can complete the download or reproduction process. Thus with the casing having been closed the cellular phone can download or reproduce data.

8 Claims, 19 Drawing Sheets

OPENED POSITION

OPENED POSITION (AS SEEN LATERALLY)

CLOSED POSITION

FIG.3

| NAME | ATTRIBUTE | HELD/PRODUCED AT | FUNCTION & CHARACTERISTIC |
|---|---|---|---|
| Data | CONTENT DATA | | E.G., MUSIC DATA |
| Kc | LICENSE KEY | | KEY FOR DECRYPTING ENCRYPTED CONTENT DATA |
| {Data}Kc | ENCRYPTED CONTENT DATA | | CONTENT DATA ENCRYPTED DECRYPTABLE WITH COMMON KEY Kc. DISTRIBUTED IN THIS FORM FROM DISTRIBUTION SERVER. |
| Data-inf | ADDITIONAL INFORMATION | DISTRIBUTION SERVER | E.G., COPYRIGHT OF CONTENT DATA OR PLAINTEXT INFORMATION RELATED TO SERVER ACCESS |
| CONTENT ID | INFORMATION ON CONTENT | | CODE FOR IDENTIFYING CONTENT DATA Data |
| LICENSE ID | INFORMATION OF LICENSE | | MANAGEMENT CODE CAPABLE OF SPECIFYING ISSUANCE OF LICENSE (ALSO CAPABLE OF IDENTIFYING IT INCLUDING CONTENT ID) |
| AC | LICENSE PURCHASING CONDITION | | DESIGNATED BY USER (E.G., NO. OF LICENSES, LIMITATION ON FUNCTION) |
| AC1 | ACCESS RESTRICTION INFORMATION | | RESTRICTION ON MEMORY ACCESS (E.G., NO. OF TIMES OF REPRODUCTION ALLOWED) |
| AC2 | REPRODUCTION CIRCUIT CONTROL INFORMATION | | CONTROL INFORMATION IN CONTENT REPRODUCTION CIRCUIT (CELLULAR PHONE) (E.G., WHETHER REPRODUCTION IS ALLOWED/DISALLOWED) |

FIG.4

| NAME | ATTRIBUTE | HELD/PRODUCED AT | FUNCTION & CHARACTERISTIC |
|---|---|---|---|
| CRL | INFORMATION OF CLASS REVOCATION LIST | DISTRIBUTION SERVER MEMORY CARD | DATA OF CLASSES ON CLASS REVOCATION LIST |
| CRL_dat | | DISTRIBUTION SERVER | INFORMATION FOR UPDATING THE VERSION OF CLASS REVOCATION LIST (IN THE FORM OF DIFFERENTIAL DATA) |
| CRL_ver | | MEMORY CARD | INFORMATION OF VERSION OF CLASS REVOCATION LIST |
| KPpn | PUBLIC ENCRYPTION KEY (ASYMMETRIC KEY) | CELLULAR PHONE | DECRYPTABLE WITH Kpn. RECORDED IN THE FORM OF {KPpn//Crtfn}KPma WHEN SHIPPED. *DIFFERENT FOR EACH CELLULAR PHONE TYPE n. |
| KPmci | PUBLIC ENCRYPTION KEY (ASYMMETRIC KEY) | MEMORY CARD | DECRYPTABLE WITH Kmci. RECORDED IN THE FORM OF {KPmci//Cmci}KPma WHEN SHIPPED. *DIFFERENT FOR EACH MEMORY CARD TYPE i. |
| Kpn | SECRET DECRYPTION KEY | CELLULAR PHONE | DECRYPTION KEY UNIQUE TO CONTENT REPRODUCTION CIRCUIT (CELLULAR PHONE). *DIFFERENT FOR EACH CELLULAR PHONE TYPE n. |
| Kmci | SECRET DECRYPTION KEY | MEMORY CARD | DECRYPTION KEY UNIQUE TO MEMORY CARD. *DIFFERENT FOR EACH MEMORY CARD TYPE i. |
| Crtfn | CLASS CERTIFICATE | CELLULAR PHONE | CONTENT REPRODUCTION CIRCUIT CLASS CERTIFICATE.HAS AUTHENTICATION FUNCTION. RECORDED IN THE FORM OF {KPpn//Crtfn}KPma WHEN SHIPPED. *DIFFERENT FOR EACH CELLULAR PHONE CLASS n. |
| Cmci | | MEMORY CARD | MEMORY CARD CLASS CERTIFICATE.HAS AUTHENTICATION FUNCTION. RECORDED IN THE FORM OF {KPmci//Cmci}KPma WHEN SHIPPED. *DIFFERENT FOR EACH MEMORY CARD CLASS i. |

FIG.5

| NAME | ATTRIBUTE | HELD/PRODUCED AT | FUNCTION & CHARACTERISTIC |
|---|---|---|---|
| Ks1 | COMMON KEY | DISTRIBUTION SERVER | GENERATED FOR EACH DISTRIBUTION SESSION |
| Ks2 | | MEMORY CARD | GENERATED FOR EACH DISTRIBUTION/REPRODUCTION SESSION |
| Ks3 | | CELLULAR PHONE | GENERATED FOR EACH REPRODUCTION SESSION |
| Km | SECRET DECRYPTION KEY | MEMORY CARD | DECRYPTION KEY UNIQUE TO EACH MEMORY CARD DATA ENCRYPTED WITH KPm IS DECRYPTABLE WITH Km. |
| KPm | PUBLIC ENCRYPTION KEY (ASYMMETRIC KEY) | MEMORY CARD | ENCRYPTION KEY UNIQUE TO EACH MEMORY CARD |
| KPma | PUBLIC AUTHENTICATION KEY | DISTRIBUTION SERVER | SHARED THROUGHOUT THE DISTRIBUTION SYSTEM. |

DATA TERMINAL DEVICE CAPABLE OF CONTINUING TO DOWNLOAD ENCRYPTED CONTENT DATA AND A LICENSE OR REPRODUCE ENCRYPTED CONTENT DATA WITH ITS CASING IN THE FORM OF A SHELL CLOSED

BACKGROUND OF THE INVENTION

1. Field of the Invention

The present invention relates to data terminal devices used in data distribution systems capable of protecting the copyright of copied information.

2. Description of the Background Art

In recent years the Internet and other similar information communication networks have advanced and a cellular phone or the like is used for a personal terminal to allow the user to readily access network information.

On such an information communication network a digital signal is used to transmit information. As such, if a user copies music, video data or the like transmitted on such an information communication network as described above, each individual user can copy such data almost free of significant degradation in the quality of sound, image and the like.

Thus, if music data, image data or other similar creations in copyright are transmitted on such an information communication network without any appropriate approach taken to protect the copyright, the copyright owner may have his/her right infringed significantly.

However, prioritizing copyright protection and preventing distribution of copyrighted data on a rapidly expanding digital information communication work, is disadvantageous to copyright owners, who basically can collect a predetermined copyright fee for copying copyrighted data.

In contrast, if digital data recorded in a recording medium, e.g., music data recorded in a normally sold compact disc (CD), is copied to a magneto-optical disk (such as an MD), it may be copied, as desired, as long as the copied data is solely for personal use, although an individual user who example digitally records data is required to indirectly pay as a bond to the copyright owner a predetermined portion of the price of the exact digital recording equipment, MD or any other similar media used by the user.

In addition, if music data in a digital signal is copied from a CD to an MD the information is digital data copied without significant degradation and accordingly equipment is configured to prevent copying music data from a recordable MD to another MD and thus protect copyright.

As such, distributing music data, image data and other similar data to the public on a digital information communication network is itself a behavior subject to a restriction attributed to a public transmission right of a copyright owner and a sufficient approach is accordingly required for protection of copyright.

Conventional cellular phones have a casing in the form of a shell. When the casing is closed, the current telephone call is disconnected and the cellular phone enters a low power consumption mode.

More specifically, with reference to FIG. 19, the cellular phone is powered off (step S1). Whether or not the power supply key has been pressed, is detected (step S2). If so then a liquid crystal display, a backlight and the like are turned on (step S3). If not then the control returns to step S1.

Then a standby status is conferred (step S4) and the control determines whether a call key has been pressed (step S5). If so then a call status is conferred (step S6). If not then the control moves on to step S10 to determine whether the casing in the form of the shell is open or closed.

During a call, the control determines whether a disconnection key has been pressed to disconnect the call (step S7). If so then the control returns to step S4.

If not then the control determines whether the casing has been closed (step S8). If not then the control returns to step S6.

If so the call is disconnected (step S9) and the cellular phone is conferred a standby status on with the casing closed (step S11). In the step S11 condition a low power supply consumption mode is set.

At step S10 if the control determines that the casing has been closed then the control moves on to step S11 and if the control determines that the casing is open then the control moves on to step S4.

In the step S11 condition, the control determines whether the casing is open or closed (step S12) and if the casing is closed then the control stays at step S11 and if the casing is opened then the control moves on to step S3.

In other words, to continue a call (including mails, communications via personal computers, and the like) the conventional cellular phone in the form of a shell must have its casing in the form of the shell kept open.

Conventional cellular phones in the form of a shell cannot download or reproduce encrypted content data with a copyright sufficiently protected, a license key and the like. If the encrypted content data, the license key and the like are configured to be downloaded and reproducible, the cellular phone still needs to have its casing in the form of the shell kept open while it downloads or reproduces the data, the key and the like. Such is particularly inconvenient if a large amount of data such as music content is downloaded and reproduced as the casing needs to be kept open for a long period of time.

SUMMARY OF THE INVENTION

Therefore the present invention contemplates a data terminal device having a casing in the form of a shell and capable of continuing to download encrypted content data, a license key and the like or reproduce encrypted content data with the casing closed.

The present invention in one aspect provides a data terminal device accommodated in a casing in a form of a shell, downloading from a distribution server encrypted content data and a license key decrypting the encrypted content data, and reproducing the encrypted content data, including: a communication unit externally effecting a communication; a data recording device recording the encrypted content data and the license key therein, and receiving authentication data and outputting the license key only when the authentication data is authenticated; an interface; a control unit; a detection unit detecting whether the casing is open/closed; and a power supply control unit controlling whether to supply various components with power.

When the detection unit detects that the casing is closed download of the encrypted content data is started, the power supply control unit controls supplying power required for a call to complete downloading the encrypted content data. Preferably, when the data terminal device with the casing closed completes downloading the encrypted content data, the power supply control unit for example stops supplying the power and controls a standby mode function of the various components internal to the data terminal device to shift the data terminal device to a low power consumption mode.

Or the data terminal device includes a reproduction unit and when the detection unit detects that the casing is closed after reproduction of the encrypted content data is started the power supply control unit controls supplying power required for a reproduction process to complete reproducing the encrypted content data. Preferably, when the data terminal device with the casing closed completes reproducing the encrypted content data, the power supply control unit for example stops supplying the power and controls a standby mode function of the various components internal to the data terminal device to shift the data terminal device to a low power consumption mode.

The present invention in another aspect provides a data terminal device accommodated in a casing in a form of a shell, downloading from a distribution server encrypted content data and a license key decrypting the encrypted content data, recording the encrypted content data and the license key in a data recording device, and reproducing the encrypted content data via the data recording device, including: a communication unit; an interface; a control unit; a detection unit; and a power supply control unit.

When the detection unit detects that the casing is closed after download of the encrypted content data is started, the power supply control unit controls supplying power required for a call to complete downloading the encrypted content data. Preferably, when the data terminal device with the casing closed completes downloading the encrypted content data, the power supply control unit for example stops supplying the power and controls a standby mode function of the various components internal to the data terminal device to shift the data terminal device to a low power consumption mode.

Or the data terminal device includes a reproduction unit and when the detection unit detects that the casing is closed after reproduction of the encrypted content data is started the power supply control unit controls supplying power required for a reproduction process to complete reproducing the encrypted content data. Preferably, when the data terminal device with the casing closed completes reproducing the encrypted content data, the power supply control unit for example stops supplying the power and controls a standby mode function of the various components internal to the data terminal device to shift the data terminal device to a low power consumption mode.

Thus if the present device has its casing closed while it is downloading encrypted content data, it still can complete downloading the data. In particular, it is no longer necessary to leave the device with the casing open if it downloads a large amount of data such as music content.

Furthermore if the present device has its casing closed while it is reproducing encrypted content data, it still can complete reproducing the data. This eliminates the necessity of leaving the device with the casing open.

Furthermore the present device can download and reproduce encrypted content data while the copyright of the data can sufficiently be protected.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawing:

FIGS. 3–5 are tables of data, information and the like used in the FIG. 1 data distribution system for communication;

DESCRIPTION OF THE PREFERRED EMBODIMENTS

Figure 1:
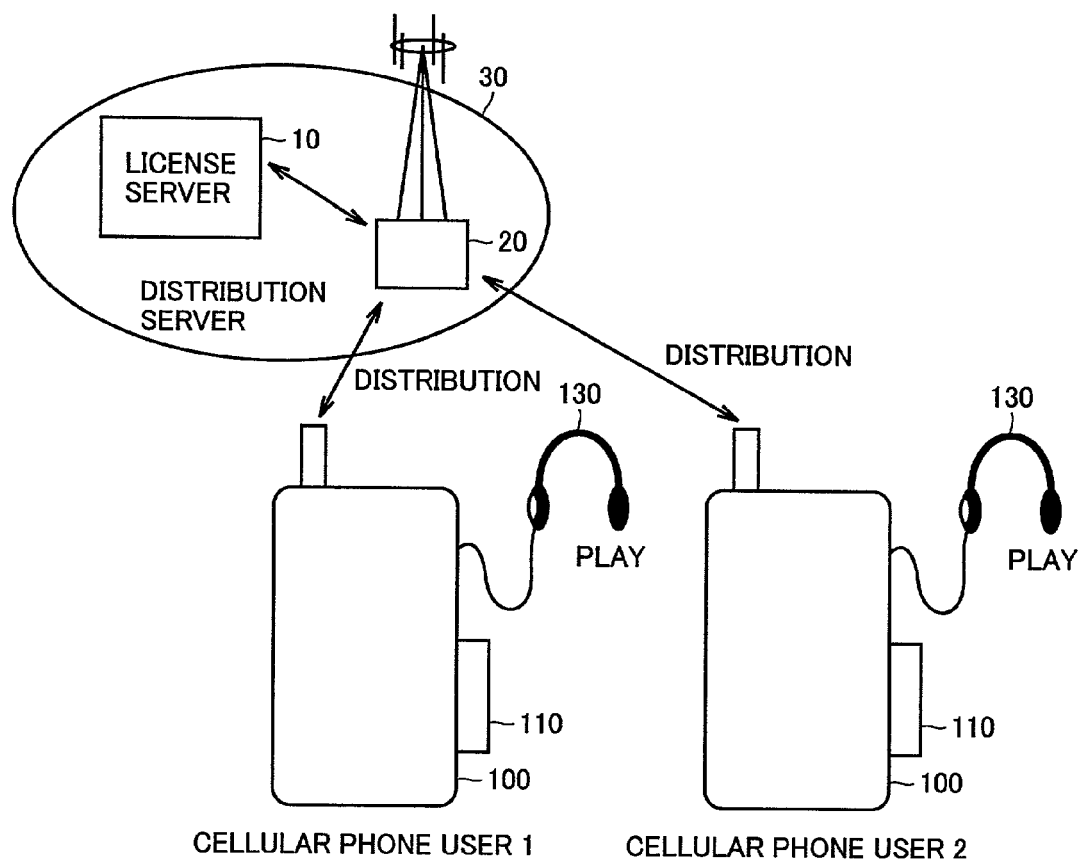
FIG. 1 is a schematic diagram illustrating a concept of a data distribution system.

The embodiments of the present invention will now be described with reference to the drawings more specifically. In the figures, like portions are denoted by like reference characters.

First Embodiment

FIG. 1 is a schematic diagram for illustrating a concept of a general configuration of a data distribution system wherein a distribution server distributes encrypted content data, which a data terminal device of present invention reproduces, to a memory card.

Note that hereinafter a description will by way of example be provided of a configuration of a data distribution system distributing digital music data to each cellular phone user on a cellular phone network, although, as will be apparent from the following description, the present invention is not limited thereto and it is also applicable to distributing content data corresponding to other types of creations, such as image data, animated image data, and the like. Furthermore the present invention is also applicable to distribution on different information communication networks.

With reference to FIG. 1, license server 10, managing copyrighted music data, is accessed by a cellular phone user 1 requesting a data distribution via a cellular phone 100 having a memory card 110 attached thereto. The server effects an authentication process to determine whether memory card 110 holds proper authentication data or memory card 110 is a proper memory card and if so then it uses a predetermined encryption system to encrypt music data (hereinafter also be referred to as content data) and provides such encrypted content data to a cellular phone company corresponding to a distribution carrier 20 distributing data.

Distribution carrier 20 receives a distribution request from each cellular phone user and relays it via its cellular phone network to license server 10. License server 10, in response to the distribution request, confirms whether the memory card or the like is proper equipment and if so then license server 10 encrypts the requested content data and distributes the encrypted content data on the cellular phone network of distribution carrier 20. The data is thus distributed to the cellular phone of the cellular phone user and thus received by the memory card attached thereto.

In FIG. 1, for example a cellular phone user 1 uses a cellular phone 100 with a detachable memory card 110 attached thereto. Memory card 110 receives the encrypted content data received by cellular phone 10 and stores the data. Furthermore, memory card 110 receives a license key through an authentication process effected for the aforementioned distribution and stores data. Then memory card 110 decrypts encrypted data and provides the decrypted data to a music reproduction unit (not shown) of cellular phone 100.

Furthermore, a cellular phone user can listen, for example via a headphone 130 connected to cellular phone 100, to encrypted content data that is decrypted with a license key and thus "reproduced."

Hereinafter, such license server 10 and distribution carrier 20 will generally be referred to as a distribution server 30.

Furthermore, a process of transmitting content data from distribution server 30 for example to each cellular phone will be referred to as "distribution."

Figure 2A:
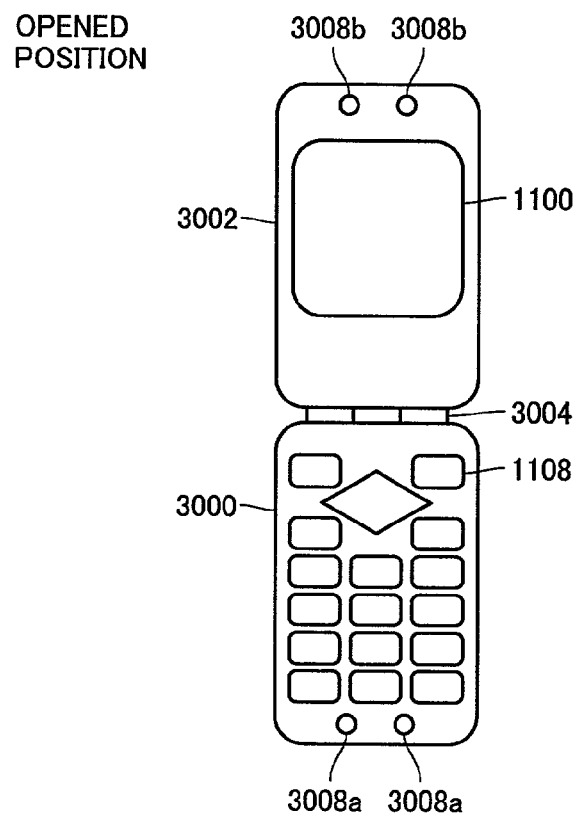
FIGS. 2A, 2B and 2C show a cellular phone with its casing in the form of a shell opened and closed.
Figure 2B:
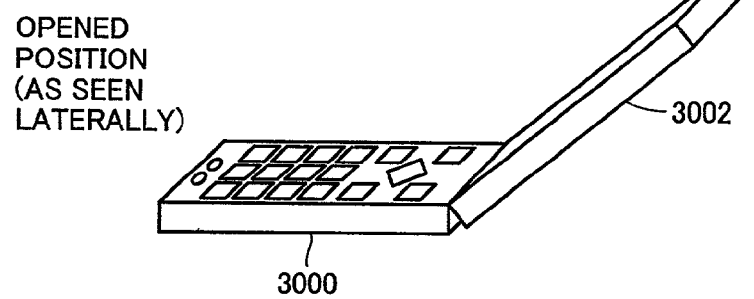
Figure 2C:
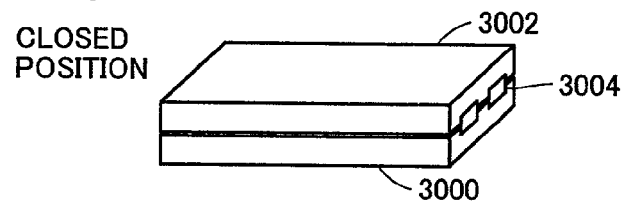

Cellular phone 100 has a casing in the form of a shell, as shown in FIGS. 2A–2C. The casing is formed of a main body 3000, a flap 3002 and a movable joint 3004. For example, main body 3000 has keys 1108 arranged to allow a user to input data, and flap 3002 has a display 1100 arranged to display data. Movable joint 3004 allows cellular phone 100 to be closed from an opened position as shown in FIGS. 2A and 2B to a closed position as shown in FIG. 2C and also opened from the FIG. 2C closed position to the FIGS. 2A and 2B opened position.

As will be described hereinafter, a detection unit 1117 detects whether the casing in the form of the shell is open or closed. For example, it determines that the casing is closed when a specific portion 3008a on a surface of main body 3000 is brought into contact with a specific portion 3008b on a surface of flap 3002.

As has been described above, when it has been confirmed that memory card 110 attached to cellular phone 100 is a proper memory card, distribution server 30 distributes content data. As such, first of all, if memory card 110 is not used, content data distributed by distribution server 30 can hardly be received or reproduced as music.

Furthermore, if whenever distribution carrier 20 distributes the content data of a single piece of music the distribution frequency increments and whenever a cellular phone user receives or downloads the content data a copyright fee incurs and it is collected by distribution carrier 20 together with the phone toll of the cellular phone, the copyright owner can readily collect the copyright fee.

In such a configuration, to allow encrypted and distributed content data to be reproduced on the side of a cellular phone user, a system is initially required to be a system for distributing an encryption key in a communication, secondly the exact system encrypting content data to be distributed, thirdly a configuration implementing content data protection for preventing such distributed content data from being copied without permission, and fourthly a configuration capable of completing a currently continuing process (e.g., a download process, a reproduction process) with the casing in the form of a shell closed.

In the first embodiment, in particular when any of distribution and reproduction sessions occurs, whether or not the content data's destination is a proper destination can be determined and checked severely, and for any recording devices and content reproduction devices (cellular phones) that are not authenticated or are with a decryption key broken, outputting the content data thereto can be prevented and the copyright of the content data can thus more firmly be protected, and furthermore in a cellular phone with the casing in the form of a shell closed a currently continuing download process or reproduction process still can be completed.

FIG. 3 is a list of characteristics of data, information and the like used in the FIG. 1 data distribution system for a communication.

Initially, data distributed from distribution server 30 will be described. "Data" is content data such as music data. Content data Data is encrypted, decryptable with a license key Kc. It is encrypted with license key (hereinafter also be referred to as a "content key") Kc to be decryptably encrypted content data {Data} Kc which is in turn distributed from distribution server 30 to a cellular phone user.

Note that hereinafter, a representation {Y} X will refer to data Y encrypted decryptable with a decryption key X.

Furthermore, distribution server 30 distributes together with the encrypted content data additional information Data-inf corresponding to plaintext information on the copyright of content data, server access, and the like. Furthermore, as the license information, there exist a content ID serving as a code for identifying content data Data and a license ID serving as a management code capable of specifying an issuance of a license, and access restriction information AC1 and reproduction circuit control information AC2 generated from license purchasing condition AC including a number of licenses, a limitation on a function and other similar information that are determined as designated by a user. Hereinafter license key Kc, the content ID, the license ID, access control information AC1 and reproduction circuit control information AC2 will generally be referred to as a license.

Reference will now be made to FIG. 4 to describe characteristics of data, information and the like used in the FIG. 1 data distribution system for an authentication and operating a revocation class list.

In the first embodiment a class revocation list (CRL) is used to revoke content data distribution and reproduction for each recording device (memory card) class and each content data reproducing, data terminal device (cellular phone) class. Hereinafter, CRL will also represent data in the class revocation list, as required.

Information related to the class revocation list includes class revocation list data CRL listing classes of data terminal devices and memory cards that are revoked from license distribution and reproduction.

Class revocation list data CRL is managed in distribution server 30 and also recorded and thus held in a memory card. Such a class revocation list needs to be upgraded, as appropriate, to update data. To change the data, distribution server 30 generates differential data CRL_dat basically reflecting only the changed portion(s) of the data and class revocation list CRL in the memory card is rewritten accordingly. Furthermore, the version of the class revocation list is managed by distribution server 30, which receives and confirms CRL_ver output from the memory card. Differential data CRL_dat also includes information on a new version. Furthermore the version information may includes a date and time when the data is updated.

Thus class revocation list CRL can be held and managed not only in a distribution server but also in a memory card to revoke distributing a license key to a data terminal device and memory card with a decryption key unique to the class, or a decryption key unique to the type of the data terminal device and memory card, broken. Thus the data terminal device cannot reproduce content data and the memory card cannot transfer content data.

Thus, class revocation list CRL in a memory card is configured to have data updated successively when distribution is effected. Furthermore in a memory card class revocation list CRL is managed for example by recording it in a memory card at a tamper resistant module independently of the upper level(s) to prevent class revocation list data CRL from being improperly changed from the upper level(s) by means for example of file systems, application programs and the like. Thus, protection of copyright of data can further be enhanced.

A data terminal device (a cellular phone) and a memory card are provided with unique public encryption keys KPpn and KPmci, respectively. Public encryption keys KPpn and KPmci are decryptable with a secret decryption key Kpn unique to the data terminal device and a secret decryption key Kmci unique to the memory card, respectively. These public encryption and secret decryption keys each have a different value for each data terminal device type and each memory card type. These public encryption and secret decryption keys will generally be referred to as a class key.

Furthermore, there are also provided class certificates Crtfn and Cmci for a reproduction circuit and a memory card, respectively.

These class certificates have different information for each memory card class and each content reproduction unit (cellular phone) class. A class key with an encryption thereby broken, i.e., that with a secret decryption key obtained is listed on the class revocation list and thus prevented from license issuance.

The public encryption keys and class certificates unique to the memory card and the content reproduction unit are recorded in a memory card and a cellular phone in the form of authentication data {KPmci//Cmci}KPma and {KPpn//Crtfn}KPma, respectively, when they are shipped. As will be described more specifically, KPma represents a public authentication key shared throughout a distribution system.

FIG. 5 collectively describes characteristics of keys relating to an encryption process in the FIG. 1 data distribution system.

When a memory card externally communicates data, encryption keys Ks1–Ks3 are used to keep the secret. Keys Ks1–Ks3 are common keys generated by server 30, cellular phone 100, and memory card 110 whenever content data is distributed and reproduced.

Herein, common keys Ks1–Ks3 are unique common keys generated for each "session" corresponding to a unit of communication or a unit of access between a server, a cellular phones and a memory cards and hereinafter will also be referred to as "session keys."

Session keys Ks1—Ks3 each have a unique value for each communication session and thus managed by a distribution server, a cellular phone and a memory card. More specifically, session key Ks1 is generated by the distribution server for each distribution session. Session key Ks2 is generated by the memory card for each distribution session and each reproduction session, and session key Ks3 is generated in the cellular phone for each reproduction session. In each session, these session keys can be communicated at a session key generated by other equipment can be received and used to effect encryption and a license key and the like can then be transmitted to enhance security in the session.

Furthermore, as a key for managing a data-processing in memory card 110, there exist a public encryption key KPm set for each medium corresponding to a memory card and a secret decryption key Km unique to each memory card and capable of decrypting data encrypted with public encryption key KPm.

Figure 6:
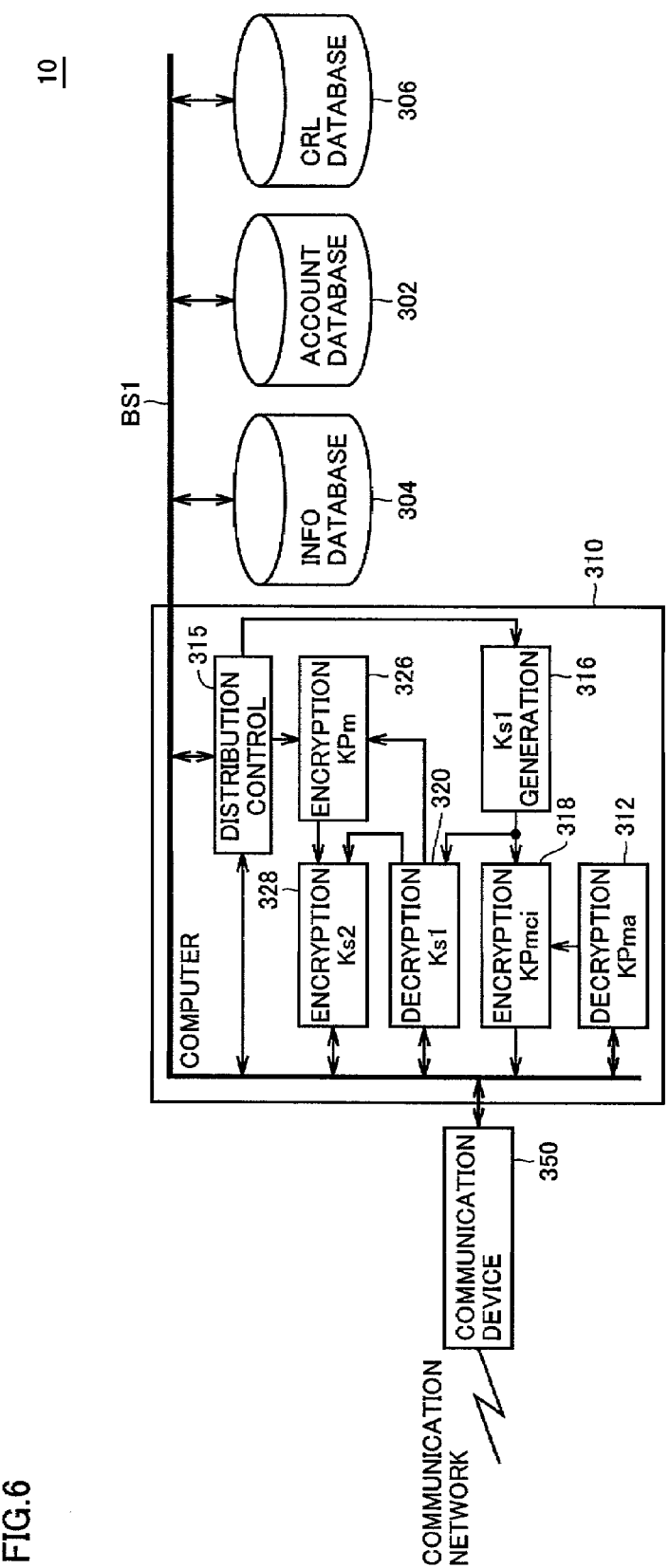
FIG. 6 is a schematic block diagram showing a configuration of a license server.

FIG. 6 is a schematic block diagram showing a configuration of the FIG. 1 license server 10.

License server 10 includes an information database 304 provided to hold content data encrypted in a predetermined system, information on distribution for example of a license ID and the like, an account database 302 provided to hold account information for each cellular phone user starting an access to content data, a CRL database 306 provided to manage class revocation list CRL, a data processing unit 310 receiving data from information database 304, account database 302 and CRL database 306 via a data bus Bs1 and processing the received data, as predetermined, and a communication device 350 communicating data between distribution carrier 20 and data processing unit 310 on a communication network.

Data processing unit 310 includes a distribution control unit 315 receiving data on data bus BS1 and accordingly controlling an operation of data processing unit 310, a session key generation unit 316 controlled by distribution control unit 315 to generate session key Ks1 in a distribution session, a decryption unit 312 receiving via communication device 350 and on data bus BS1 authentication data {KPmci//Cmci}KPma for authentication transmitted from a memory card and a cellular phone, and decrypting the received data with public authentication key KPma, an encryption unit 318 encrypting session key Ks1 generated by session key generation unit 316, with public encryption key KPmci obtained by decryption unit 312, for output on data bus BS1, and a decryption unit 320 receiving and decrypting data encrypted with session key Ks1 and then transmitted on data bus BS1.

Data processing unit 310 further includes an encryption unit 326 encrypting license key Kc and reproduction circuit control information AC2 received from distribution control unit 315 with public encryption key KPm obtained by decryption unit 320 that is unique to a memory card, and an encryption unit 328 further encrypting an output of encryption unit 326 with session key Ks2 received from decryption unit 320, for output on data bus BS1.

License server 10 in a distribution session operates, as will later be described with reference to a flow chart.

Figure 7:
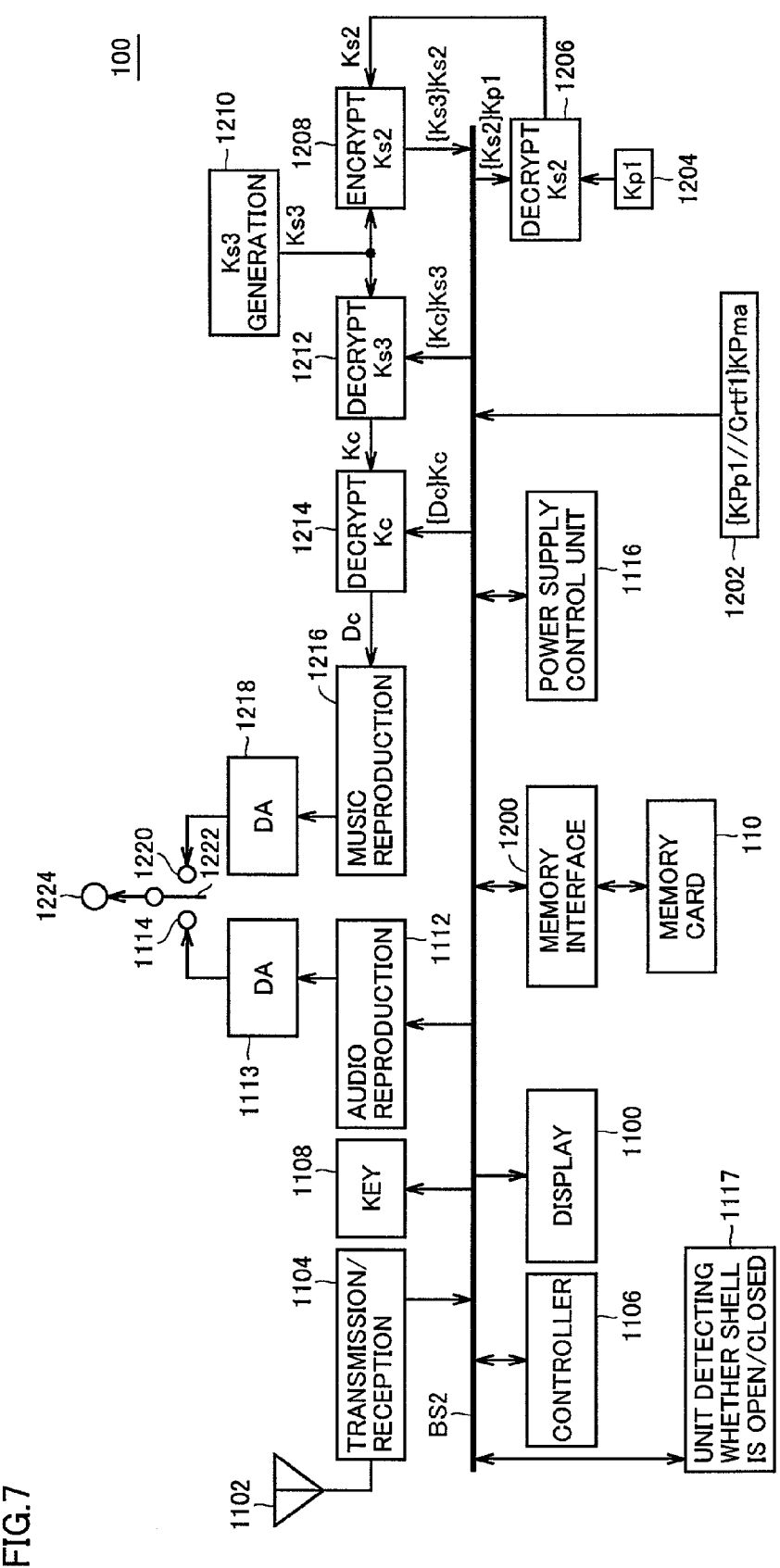
FIG. 7 is a block diagram showing a configuration of a cellular phone.

FIG. 7 is a schematic block diagram for illustrating a configuration of the FIG. 1 cellular phone 100.

Cellular phone 100 includes an antenna 1102 receiving a signal transmitted on a cellular phone network by wireless, a transmission and reception unit 1104 receiving a signal from antenna 1102 and converting the received signal to a baseband signal or modulating data received from the cellular phone and providing the modulated data to antenna 1102, a data bus BS2 allowing data communication between components of cellular phone 100, and a controller 1106 controlling an operation of cellular phone 100 via data bus BS2.

Cellular phone 100 further includes a key operation unit 1108 operated to input an external instruction to cellular phone 100, a display 1100 presenting information output for example from controller 1106 to a cellular phone user visibly, and an audio reproduction unit 1112 operative in a normal conversation operation to reproduce speech based on data received on data bus BS2.

Cellular phone 100 also includes a DA converter 1113 converting an output of audio reproduction unit 1112 from a digital signal to an analog signal, and a terminal 1114 outputting an output of DA converter 1113 for example to an external output device.

Cellular phone 100 further includes a detachably attachable memory card 110 storing and decrypting content data (music data) received from distribution server 30, and a memory interface 1200 controlling data communication between memory card 110 and data bus BS2.

Cellular phone 100 further includes an authentication data hold unit 1202 holding authentication data {KPp1//Crtf1}KPma, an encryption of public encryption key KPp1 and class certificate Crtf1 set for each cellular phone type (or class) that has its authenticity verified when they are decrypted with public decryption key KPma.

Cellular phone 100 further includes a Kp1 hold unit 1204 holding a decryption key Kp1 unique to the class of the cellular phone (the content reproduction circuit), and a decryption unit 1206 using decryption key Kp1 to decrypt data received on data bus BS2, and obtaining session key Ks2 generated by memory card 110.

Cellular phone 100 further includes a session key generation unit 1210 using a random number or the like to generate session key Ks3 for encrypting data communicated with memory card 110 on data bus BS2 in a reproduction session reproducing content data stored in memory card 110, and an encryption unit 1208 using session key Ks2 obtained by decryption unit 1206, to encrypt generated session key Ks3 for output on data bus BS2.

Cellular phone 100 further includes a decryption unit 1212 using session key Ks3 to decrypt data on data bus BS2 for output.

Cellular phone 100 further includes a decryption unit 1214 receiving encrypted content data {Data}Kc on data bus BS2, decrypting the received data with license key Kc obtained from decryption unit 1212, and outputting content data, a music reproduction unit 1216 receiving an output of decryption unit 1214 and reproducing content data, a DA converter 1218 converting an output of music reproduction unit 1216 from a digital signal to an analog signal, a switch 1222 receiving outputs of DA converters 1113 and 1218 for selective output depending on the mode of operation through terminal 1114 or 1220, and a connection terminal 1224 receiving and connecting an output of switch unit 1222 to a headphone 130.

Cellular phone 100 also includes a power supply control unit 1116 controlled by controller 1106 to control whether or not to supply power applied to operate each circuit in cellular phone 100, and a detection unit 1117 detecting whether cellular phone 100 has its casing in the form of the shell in a closed position or an opened position. Detection unit 1117 outputs a result of detection which is in turn transferred on data bus BS2 to controller 1106.

As will be described hereinafter, controller 1106 is driven by the result received from detection unit 1117, to control a power supply control block 1116 effecting a power supply process, a data download process, a data reproduction process, and the like.

Note that for the purpose of simplifying the description, FIG. 7 only shows a cellular phone at a block relating to distribution and reproduction of music data in accordance with the present invention. The cellular phone of course has a block relating to conversation, which is only partially described herein.

In cellular phone 100 each component operates in each session, as will later be described more specifically with reference to a flow chart.

Figure 8:
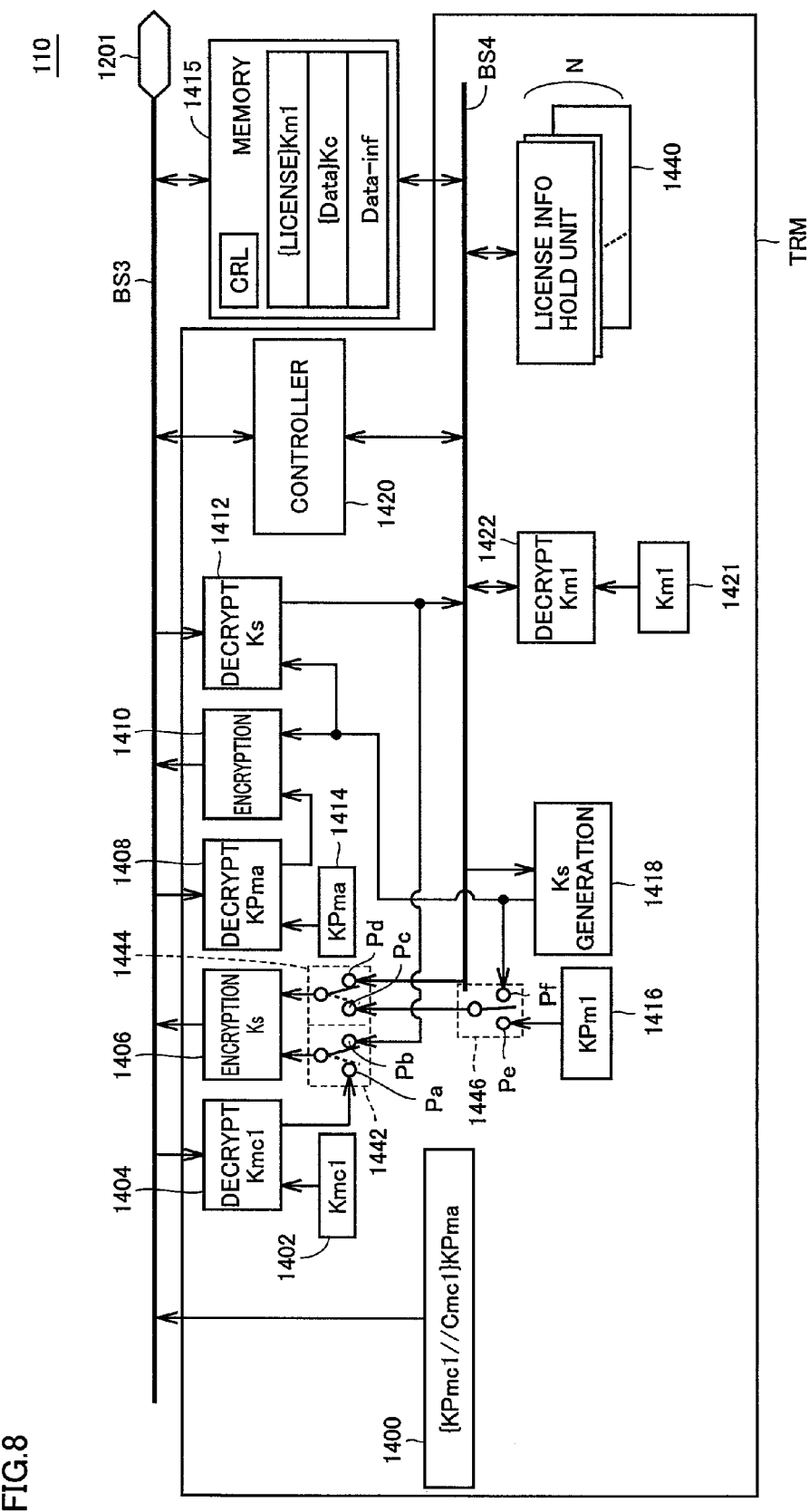
FIG. 8 is a block diagram showing a configuration of a memory card.

FIG. 8 is a schematic block diagram for illustrating a configuration of memory card 110. As has been described previously, there are provided public encryption key and secret decryption key KPmci and Kmci unique to each memory card and a memory card class certificate Cmci and for memory card 110 natural number i=1 for the sake of convenience.

Thus memory card 110 includes an authentication data hold unit 1400 holding authentication data {KPmc1//Cmc1}KPma, a Kmc hold unit 1402 holding a unique decryption key Kmc1 set for each memory card type, a Km1 hold unit 1421 holding secret decryption key Km1 set unique to each memory card, and a KPm1 hold unit 1416 holding public encryption key KPm1 decryptable with Km1. Authentication data hold unit 1400 holds public encryption key KPmc1 and class certificate Cmc1 set for each memory card type and class, in the form of authentication data {KPmc1//Cmc1}KPma, an encryption of the key and the certificate that has its authenticity verified when it is decrypted with public authentication key KPma.

By thus providing an encryption key of a recording device corresponding to a memory card, distributed content data, an encrypted license key and the like can be managed for each memory card.

Memory card 110 further includes a data bus BS3 communicating a signal with memory interface 1200 via a terminal 1201, a decryption unit 1404 receiving data on data bus BS3 via memory interface 1200 and secret decryption key Kmc1 unique to each memory card type from Kmc1 hold unit 1402, and outputting to a contact Pa session key Ks1 generated by distribution server 30 in a distribution session, a decryption unit 1408 receiving public authentication key KPma from KPma hold unit 1414, using public authentication key KPma to decrypt data received on data bus BS3, and outputting a result of the decryption to encryption unit 1410, and an encryption unit 1406 using a key selectively provided via switch 1442, to encrypt data selectively provided via switch 1444, for output on data bus BS3.

Memory card 110 further includes a session key generation unit 1418 generating session key Ks2 in each of distribution and reproduction sessions, a encryption unit 1410 encrypting session key Ks2 output from session key generation unit 1418, with public encryption key KPpn or KPmci obtained by decryption unit 1408, for output on data bus BS3, and a decryption unit 1412 receiving on BS3 the data encrypted with session key Ks2, decrypting the received data with session key Ks2 obtained from session key generation unit 1418, and outputting a result of the decryption on data bus BS4.

Memory card 110 further includes a decryption unit 1422 decrypting data on data bus BS4 with secret decryption key Km1 unique to memory card 110 and paired with public encryption key KPm1, and a memory 1415 receiving on data bus BS3 and storing therein license key Kc, reproduction circuit control information AC2 and reproduction information (a content ID, a license ID, access control information AC1) encrypted with public encryption key KPm1 and class revocation list data CRL updated, as appropriate, by differential data CRL_dat provided to update a version of the class revocation list that is not encrypted, and also receiving and storing therein encrypted content data {Data}Kc and additional information Data-inf transmitted on data bus BS3. Memory 1415 is for example a semiconductor memory device.

Memory card 110 further includes a license information hold unit 1440 holding a license ID, a content ID and access restriction information AC1 obtained by decryption unit 1422, and a controller 1420 communicating data externally on data bus BS3 and receiving reproduction information and the like on data bus BS4 to control an operation of memory card 110.

License information hold unit 1440 is capable of transmitting and receiving the data of a content ID, a license ID, access control information AC1 on data bus BS4. License information hold unit 1440 has N banks, wherein N represents a natural number, and holds for each bank the license information corresponding to each license.

Note that in FIG. 8, the portion surrounded by a solid line is adapted to be incorporated in memory card 110 at a module TRM so that for example when it is externally, improperly opened, internal data is erased or internal circuitry is destroyed to prevent a third party from reading for example data in a circuit existing in the portion surrounding by the solid line. Such a module is typically the tamper resistant module.

Of course memory 1415 may also together be incorporated into module TRM, although in the FIG. 8 configuration, with memory 1415 holding reproduction information required for reproduction, all in the form of encrypted data, a third party simply having the data in memory 1415 cannot reproduce music and furthermore it is not necessary to arrange memory 1415 in the expensive tamper resistance module and the production cost can thus be reduced.

The FIG. 1 data distribution system operates in each session, as will now be described more specifically with reference to a flow chart.

Figure 9:
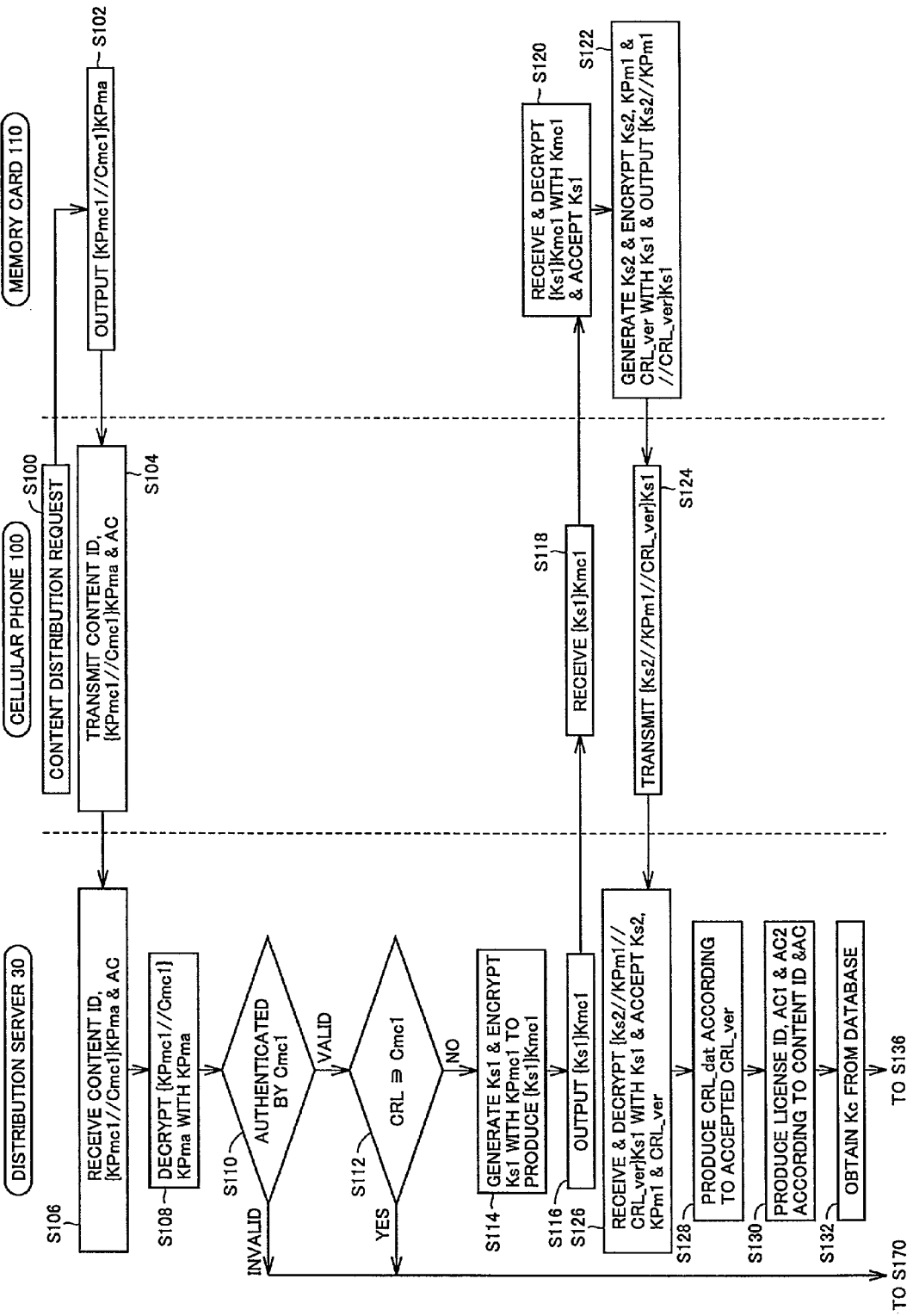
FIGS. 9 and 10 are first and second flow charts, respectively, for illustrating a distribution operation in the FIG. 1 data distribution system.
Figure 10:
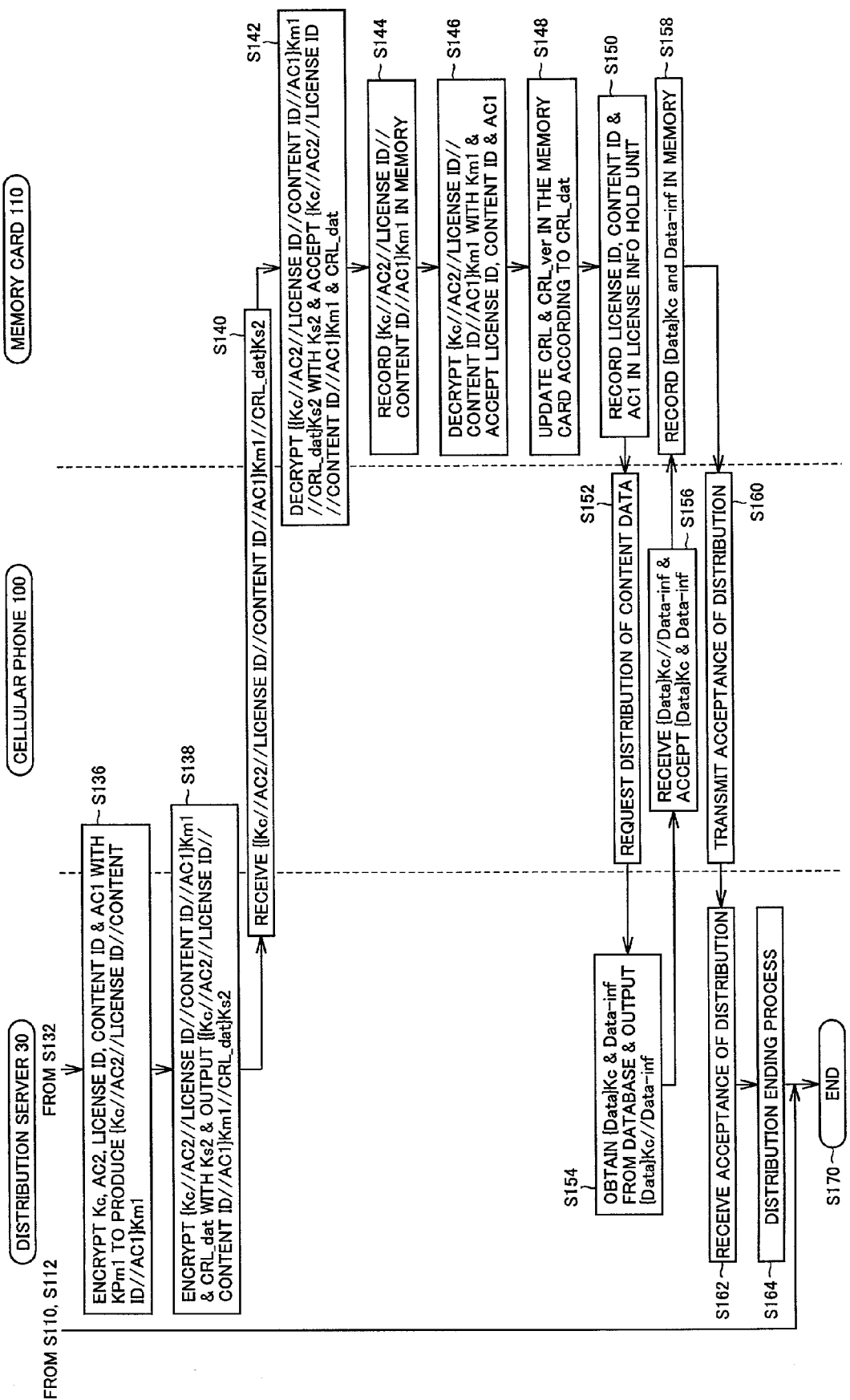

FIGS. 9 and 10 are first and second flow charts, respectively, for illustrating a distribution operation (hereinafter also referred to as a distribution session) provided in purchasing content in the FIG. 1 data distribution system.

In FIGS. 9 and 10 is described an operation when cellular phone user 1 uses memory card 110 to receive via cellular phone 100 content data corresponding to music data distributed from distribution server 30.

Initially, cellular phone user 1 of cellular phone 100 for example presses a key button on key operation unit 1108 to issue an request to distribute data (step S100).

In memory card 110 responds to the distribution request by allowing authentication data hold unit 1400 to output authentication data {KPmc1//Cmc1}KPma (step S102).

Cellular phone 100 transmits authentication data {KPmc1//Cmc1}KPma received from memory card 110 for authentication, as well as a content ID and license purchasing condition data AC to distribution server 30 (step S104).

Distribution server 30 receives the content ID, authentication data {KPmc1//Cmc1}KPma and license purchasing condition data AC from cellular phone 100 (step S106) and decryption unit 312 effects a decryption process using public authentication key KPma to decrypt the authentication data output from memory card 110 (step S108).

Distribution control unit 315 is driven by a result of the decryption process in decryption unit 312 to effect an authentication process to determine whether the process of interest has been normally effected, i.e., to authenticate that memory card 110 holds public encryption key KPmc1 and certificate Cmc1 of a proper memory card. In doing so, distribution control unit 315 in the authentication process determines whether authentication data encrypted by an authorizer to verify its authenticity is received (step S110). If so then distribution control unit 315 approves and accepts public encryption key KPmc1 and certificate Cmc1 and moves on to a subsequent step (step S112). If not then the control does not approve or accept public encryption key KPmc1 or certificate Cmc1 and terminates the process (step S170).

When the authentication process reveals that the equipment of interest is proper equipment, distribution control unit 315 sends to CRL database 306 a query as to whether memory card 110 has class certificate Cmc1 listed on class revocation list CRL. If so then the distribution session ends (step S170).

If not then the control moves on to a subsequent step (step S112).

If the authentication process reveals that a cellular phone having a memory card with proper authentication data is demanding an access and that the class is not found on the class revocation list then in distribution server 30 session key generation unit 316 produces session key Ks1 for distribution. Session key Ks1 is encrypted by encryption unit 318 using public encryption key KPmc1 obtained by decryption unit 312 and corresponding to memory card 110 (step S114).

Encrypted session key Ks1 is externally output as {Ks1}Kmc1 on data bus BS1 and via communication device 350 (step S116).

When cellular phone 100 receives encrypted session key {Ks1}Kmc1 (step S118), in memory card 110 the received data received via memory interface 1200 and transmitted on data bus BS3 is decrypted by decryption unit 1404 using secret decryption key Kmc1 held in Kmc1 hold unit 1402 and unique to memory card 110 and session key Ks1 is thus decrypted and extracted (step S120).

When controller 1420 confirms that session key Ks1 generated by distribution server 30 has accepted, it instructs session key generation unit 1418 to generate session key Ks2, which memory card 110 generates in a distribution session.

Furthermore, in the distribution session, controller 1420 extracts version data CRL_ver of the class revocation list stored in memory 1415 and outputs the data on data bus BS4. Data CRL_ver is information on a condition (a version) of the class revocation list recorded in memory card 110 at memory 1415.

Encryption unit 1406 uses session key Ks1 received from decryption unit 1404 via a contact Pa of switch 1442, to encrypt session key Ks2, public encryption key KPm1 and class revocation list version data CRL_ver provided via switches 1444 and 1446 having their respective contacts switched successively and provide them in a series of data and output encrypted data {Ks2//KPm1//CRL_ver}Ks1 on data bus BS3 (step S122).

Encrypted data {Ks2//KPm1//CRL_ver}Ks1 output on data bus BS3 is output therefrom via terminal 1201 and memory interface 1200 to cellular phone 100 and transmitted from cellular phone 100 to distribution server 30 (step S124).

Distribution server 30 receives encrypted data {Ks2//KPm1//CRL_ver}Ks1, in decryption unit 320 decrypts the data with session key Ks1, and accepts session key Ks2 generated in memory card 110, public encryption key KPm1 unique to memory card 110, and class revocation list version data CRL_ver in memory card 110 (step S126).

Class revocation list version information CRL_ver is transmitted on data bus BS1 to distribution control unit 315, which generates differential data CRL_dat according to the accepted version data CRL_ver (step S 128). Differential data CRL_dat represents a variation between the version of the CRL_ver of interest and the current version of the class revocation list data in CRL database 306.

Furthermore, distribution control unit 315 generates a license ID, access restriction information AC1 and reproduction circuit control information AC2 according to content ID and license purchasing condition AC obtained at step S106 (step S130). Furthermore it obtains license key Kc from information database 304 to decrypt encrypted content data (step S132).

With reference to FIG. 10, distribution control unit 315 provides a generated license, i.e., license key Kc, reproduction circuit control information AC2, a license ID, a content ID and access restriction information AC1 to encryption unit 326, which in turn encrypts the license with public encryption key KPm1 obtained by decryption unit 320 and unique to memory card 110 (step S136). Encryption unit 328 receives an output of encryption unit 326 and differential data CRL_dat of the class revocation list output from distribution control unit 315 on data bus BS1 and encrypts them with session key Ks2 generated in memory card 110. Encryption unit 328 outputs the encrypted data which is in turn transmitted on data bus BS1 and via communication device 350 to cellular phone 100 (step S138).

Thus, a distribution server and a memory card generate encryption keys, respectively, mutually communicate the encryption keys, use them to effect encryption, and mutually transmit the encrypted data. Thus in transmitting and receiving their respective encrypted data a mutual authentication can in effect also be achieved to enhance the security of the data distribution system.

Cellular phone 100 receives encrypted data {{Kc//AC2// license ID//content ID//AC1 }Km1//CRL_dat}Ks2 transmitted (step S140) and outputs it to memory card 110 via memory interface 1200. In memory card 110 decryption unit 1412 decrypts the data transmitted via memory interface 1200 and on data bus BS3. Decryption unit 1412 uses session key Ks2 received from session key generation unit 1418 to decrypt the received data on data bus BS3 for output on data bus BS4 (step S142).

Output at this stage on data bus BS4 are encrypted license {KC//AC2//license ID//content ID//AC1}Km1 decryptable with secret decryption key Km1 held in Km1 hold unit 1421, and CRL_dat. According to an instruction from controller 1420, encrypted license {KC//AC2//license ID//content ID// AC1}Km1 is recorded in memory 1415 (step S144). On the other hand, encrypted license {KC//AC2//license ID//content ID//AC1}Km1 is decrypted by decryption unit 1422 using secret decryption key Km1, and of the license, only the license ID, the content ID and access restriction information AC1, which are referenced in memory card 110, are accepted (step S 146).

Controller 1420 is driven by the received CRL_dat to update class revocation list data CRL in memory 1415 and the version thereof (step S148). The license ID, the content ID and access restriction information AC1 are recorded in license information hold unit 1440 (step S150).

When the process up to step S150 normally completes in a memory card, cellular phone 100 sends a request to distribution server 30 to distribute content data (step S152).

Distribution server 30 receives the content data distribution request, obtains encrypted content data {Data}Kc and additional information Data-inf from information database 304 and outputs these data on data bus BS1 and via communication device 350 (step S154).

Cellular phone 100 receives {Data}Kc//Data-inf and accepts encrypted content data {Data}Kc and additional information Data-inf (step S156). Encrypted content data {Data}Kc and additional information Data-inf are transmitted via memory interface 1200 and terminal 1201 to data bus BS3 of memory card 110. Memory card 110 records the received encrypted content data {Data}Kc and additional information Data-inf in memory 1415 as they are (step S158).

Furthermore, memory card 110 transmits to distribution server 30 a notification that the distribution has been accepted (step S160) and when distribution server 30 receives the notification (step S162) a process to complete the distribution is carried out including e.g., storing account data to account database 302 (step S164) and the entire process ends (step S170).

Thus memory card 110 attached to cellular phone 110 is confirmed as proper equipment and public encryption keys KPp1 and KPmc1 successfully encrypted and transmitted together with class certificate Cmc1 are also confirmed valid, and only then can content data be distributed in response only to a distribution request from a memory card without class certificate Cmc1 found in the class revocation list, i.e., a class certificate list with encryption by means of public encryption keys KPp1 and KPmc1 that is broken. Thus, distribution to an improper memory card and distribution using a deciphered class key can be prevented.

Figure 11:
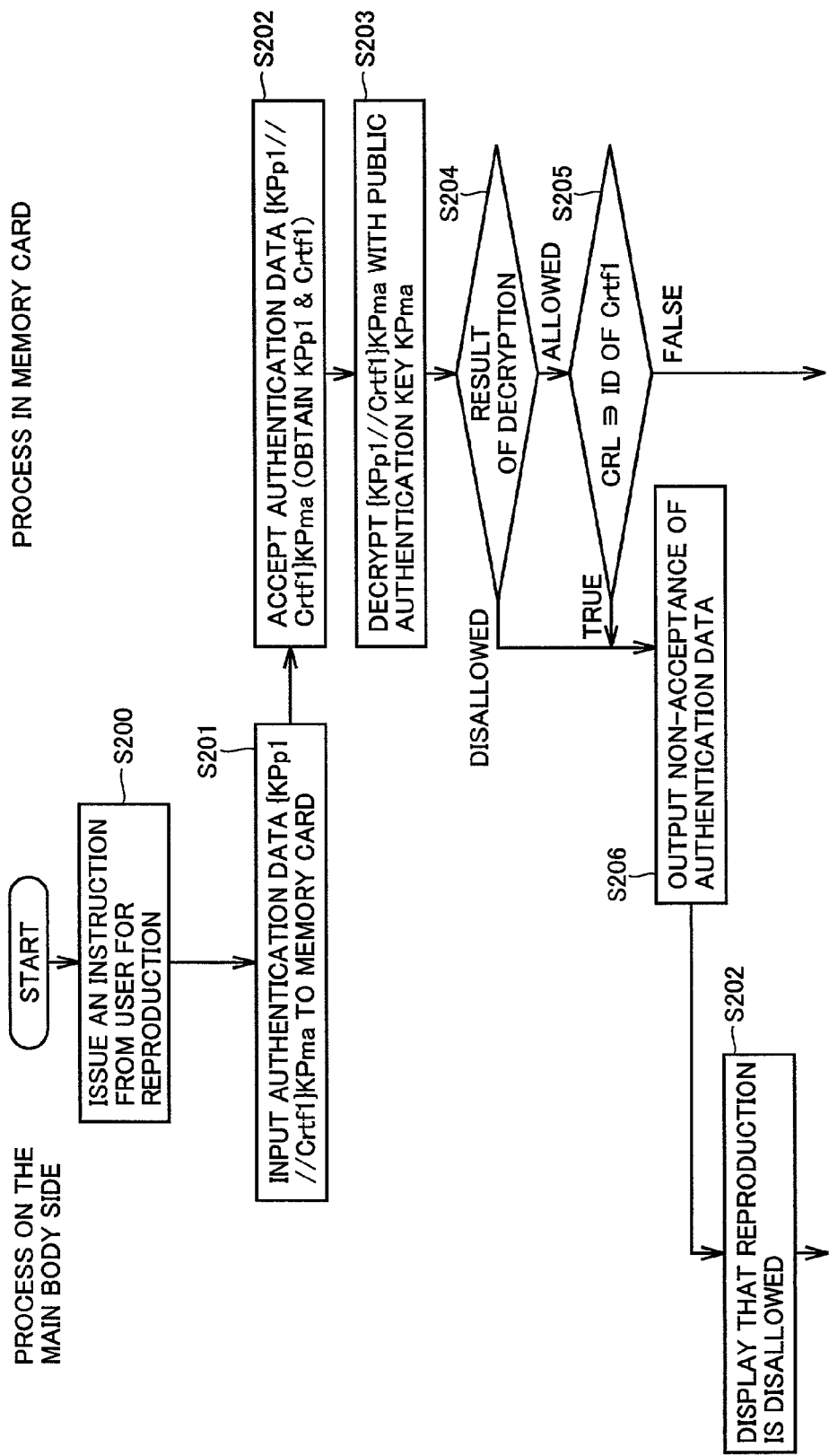
FIGS. 11 and 12 are first and second flow charts, respectively, for illustrating a reproduction operation in a cellular phone.
Figure 12:
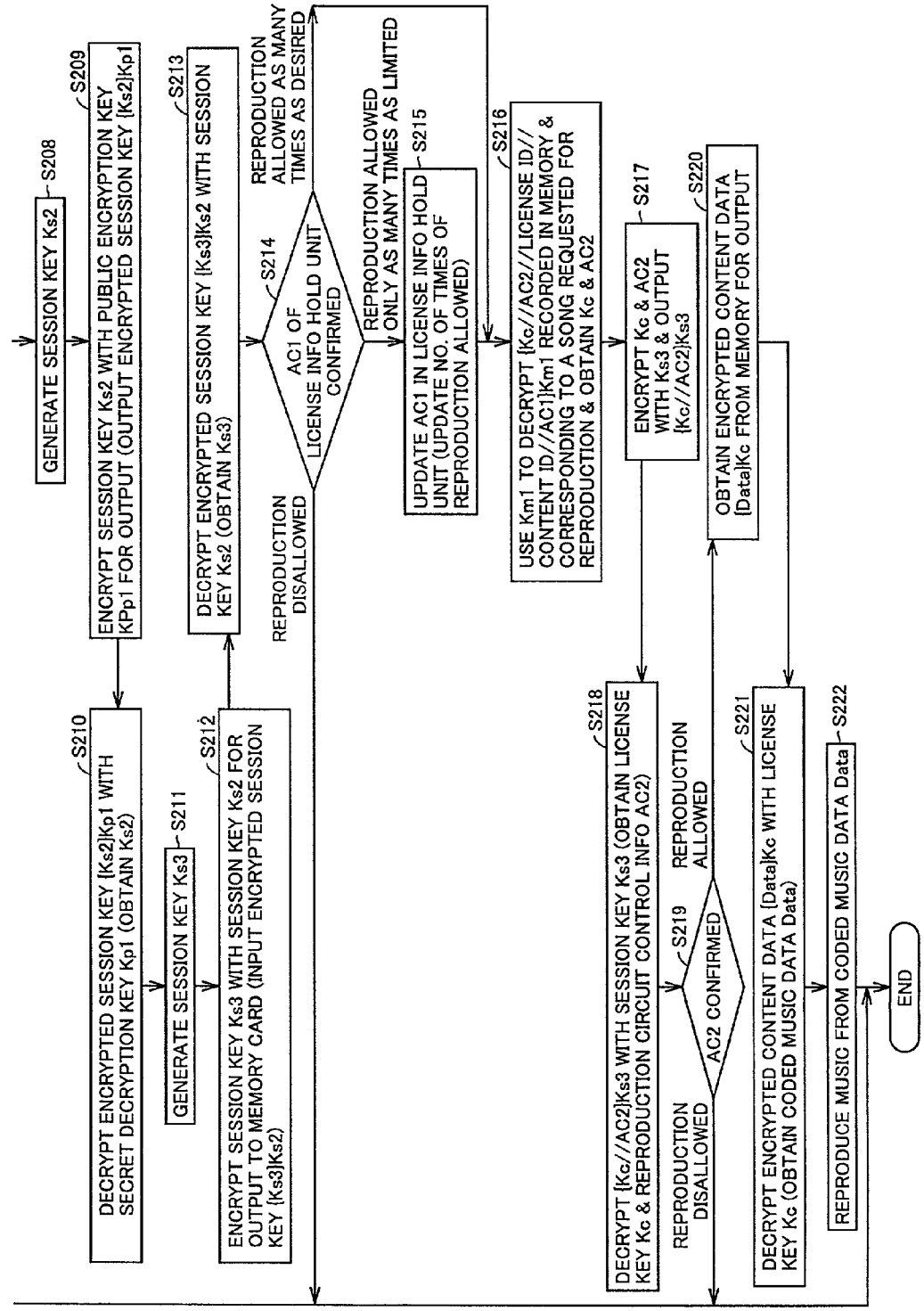

Reference will now be made to FIGS. 11 and 12 to describe a reproduction operation of cellular phone 100 reproducing content data distributed to memory card 110. With reference to FIG. 11, when the reproduction operation starts, user 1 of cellular phone 100 operates a key operation unit 1108 to input an instruction to cellular phone 100 to reproduce content data (step S200). Then controller 1106 reads authentication data {KPp1//Crtf1}KPma from authentication data hold unit 1202 via data bus BS2 and input authentication data {KPp1//Crtf1}KPma to memory card 110 via memory interface 1200 (step S201).

Then memory card 110 accepts authentication data {KPp1//Crtf1}KPma (step S202). Then in memory card 110 decryption unit 1408 decrypts the accepted authentication data {KPp//Crtf1}KPma with public authentication key KPma held in KPma hold unit 1414 (step S203) and controller 1420 effects an authentication process from a result of a decryption process effected by decryption unit 1408. More specifically, controller 1420 effects an authentication process to determine whether authentication data {KPp1// Crtf1}KPma is proper authentication data (step S204). If the data cannot be decrypted, controller 1420 provides an output indicative of non-acceptance of the authentication data via data bus BS3 and terminal 1201 to memory interface 1200 of cellular phone 100 (step S206). If the authentication data can be decrypted, controller 1420 determines whether the obtained certificate Crtf1 is included in the class revocation list data read from memory 1415 (step S205). Since certificate Crtf1 has been provided with an ID and controller 1420 thus determines whether the received certificate Crtf1 has an ID existing in the class revocation list data. If controller 1420 determines that certificate Crtf1 is included in the class revocation list data then controller 1420 provides an output indicative of non-acceptance of the authentication data via data bus BS3 and terminal 1201 to memory interface 1200 of cellular phone 100 (step S206).

If at step S204 authentication data cannot be decrypted with public authentication key KPma and certificate Crtf1 accepted at step S205 is included in the class revocation list data, an output is provided indicating that the authentication data is not accepted. In cellular phone 100 when controller 1106 receives via memory interface 1200 the output indicating that the authentication data is not accepted, it displays on display 1100 that the data of interest cannot be reproduced owing to the non-acceptance of the authentication data (step S207).

If at step S205 the control determines that certificate Crtf1 is not included in the class revocation list data then, with reference to FIG. 12, in memory card 110 a session key generation unit 1418 generates a session key Ks2 for a reproduction session (step S208). Then encryption unit 1410 outputs on data bus BS3 the session key Ks2 output from session key generation unit 1418 that is encrypted with public encryption key KPp1 decrypted by decryption unit 1418, i.e., encrypted data {Ks2}Kp1 (step S209). Then controller 1420 outputs encrypted data {Ks2}Kp1 to memory interface 1200 via terminal 1201 and controller 1106 in cellular phone 100 obtains encrypted data {Ks2}Kp1 via memory interface 1200. Then Kp1 hold unit 1204 outputs secret decryption key Kp1 to decryption unit 1206.

Decryption unit 1206 decrypts encrypted data {Ks2}Kp1 with secret decryption key Kp1 output from Kp1 hold unit 1204 that is paired with public encryption key KPp1, and decryption unit 1206 outputs session key Ks2 to encryption unit 1208 (step S210). Then session key generation unit 1210 generates session key Ks3 for a reproduction session and outputs session key Ks3 to encryption unit 1208 (step S211). Encryption unit 1208 receives session key Ks3 from session key generation unit 1210 and encrypts it with session key Ks2 received from decryption unit 1206 and thus outputs encrypted data {Ks3}Ks2 and controller 1106 outputs encrypted data {Ks3}Ks2 on data bus BS2 and via memory interface 1200 to memory card 110 (step S212).

In memory card 110 decryption unit 1412 receives encrypted data {Ks3}Ks2 via terminal 1201 and data bus BS3 and decrypts encrypted data {Ks3}Ks2 with session key Ks2 generated by session key generation unit 1418 and thus obtains session key Ks3 generated in cellular phone 100 (step S213).

In response to the acceptance of session key Ks3, controller 1420 confirms the corresponding access restriction information AC1 existing in license information hold unit 1440 (step S214).

At step S214 is confirmed access restriction information AC1, the information on a restriction imposed on memory access. If it indicates that reproduction is disallowed then the control terminates the reproduction operation. If it indicates that reproduction is allowed only as many times as limited then the control updates data of access restriction information AC1 to update the frequency of reproduction allowed and then moves on to a subsequent step (step S215). If access restriction information AC1 does not limit a reproduction frequency then the control skips step S215 and without updating reproduction control information AC1 moves on to a subsequent step (step S216).

If license information hold unit 1440 does not hold the content ID of a song requested, the control also determines that reproduction is disallowed and the control terminates the reproduction session.

If at step S214 the control determines that reproduction is possible in the reproduction operation of interest, then a decryption process is effected to decrypt a license including license key Kc recorded in memory 1415 and associated with a song requested to be reproduced. More specifically, in response to an instruction from controller 1420, encrypted license {Kc//AC2//license ID//content ID//AC1}Km1 read from memory 1415 onto data bus BS4 is decrypted by decryption unit 1422 using secret decryption key KM1 unique to memory card 110, and license key Kc and reproduction circuit control information AC2 required for a reproduction process are output on data bus BS4 (step S216).

License key Kc and reproduction circuit control information AC2 output are transmitted via a contact Pd of switch 1442 to encryption unit 1406, which in turn encrypts license key Kc and reproduction circuit control information AC2 received on data bus BS4, with session key Ks3 received from decryption unit 1412 via contact Pd of switch 1442, and outputs encrypted data {Kc//AC2}Ks3 on data bus BS3 (step S217).

The encrypted data {Kc//AC2}Ks3 output on data bus BS3 is transmitted via memory interface 1200 to cellular phone 100.

Encrypted data {Kc//AC2}Ks3 received by cellular phone 100 via memory interface 1200 is transmitted on data bus BS2 and decrypted by decryption unit 1212 and license key Kc and reproduction circuit control information AC2 are accepted (step S218). Decryption unit 1212 transmits license key Kc to decryption unit 1214 and outputs reproduction circuit control information AC2 onto data bus BS2.

Controller 1106 accepts reproduction circuit control information AC2 on data bus BS2 and confirms whether reproduction is allowed (step S219).

If at step S219 the control determines from reproduction circuit control information AC2 that reproduction is disallowed, the reproduction operation ends.

If at step S219 controller 1106 determines that reproduction is allowed, controller 1106 issues a request to memory card 110 via memory interface 1200 to provide encrypted content data {Data}Kc. Then in memory card 110 controller 1420 obtains encrypted content data {Data}Kc from memory 1415 and outputs encrypted content data {Data}Kc to memory interface 1200 on data bus BS3 and via terminal 1201 (step S220).

In cellular phone 100 controller 1106 obtains encrypted content data {Data}Kc via memory interface 1200 and feeds encrypted content data {Data}Kc on data bus BS2 to decryption unit 1214. Decryption unit 1214 decrypts encrypted content data {Data}Kc with license key Kc output from decryption unit 1212 and thus obtains content data Data (step S211).

The decrypted content data Data is output to music reproduction unit 1216. Music reproduction unit 1216 reproduces the content data and DA converter 1218 converts a digital signal to an analog signal for output to terminal 1220. Then switch 1222 selects terminal 1220 and the music data is output to headphone 130 via terminal 1224 and thus reproduced (step S222). Thus the reproduction operation completes.

User 1 of cellular phone 100 can uses cellular phone 100 to receive encrypted content data {Data}Kc and license key Kc distributed from distribution server 30, and use license key Kc to decrypt and thus reproduce encrypted content data {Data}Kc.

Note that cellular phone 100 of user 1 can also have cellular phone 100 of user 2 transfer encrypted content data {Data}Kc (and it can thus receive the data). In this case, when user 2 confirms that license key Kc decrypting encrypted content data {Data}Kc received is not recorded in memory card 110, user 2 requests distribution server 30 to distribute license key Kc.

Similarly, cellular phone 100 of user 2 can receive the license key from distribution server 30 and the license key can be used to encrypt and reproduce encrypted content data.

Figure 13:
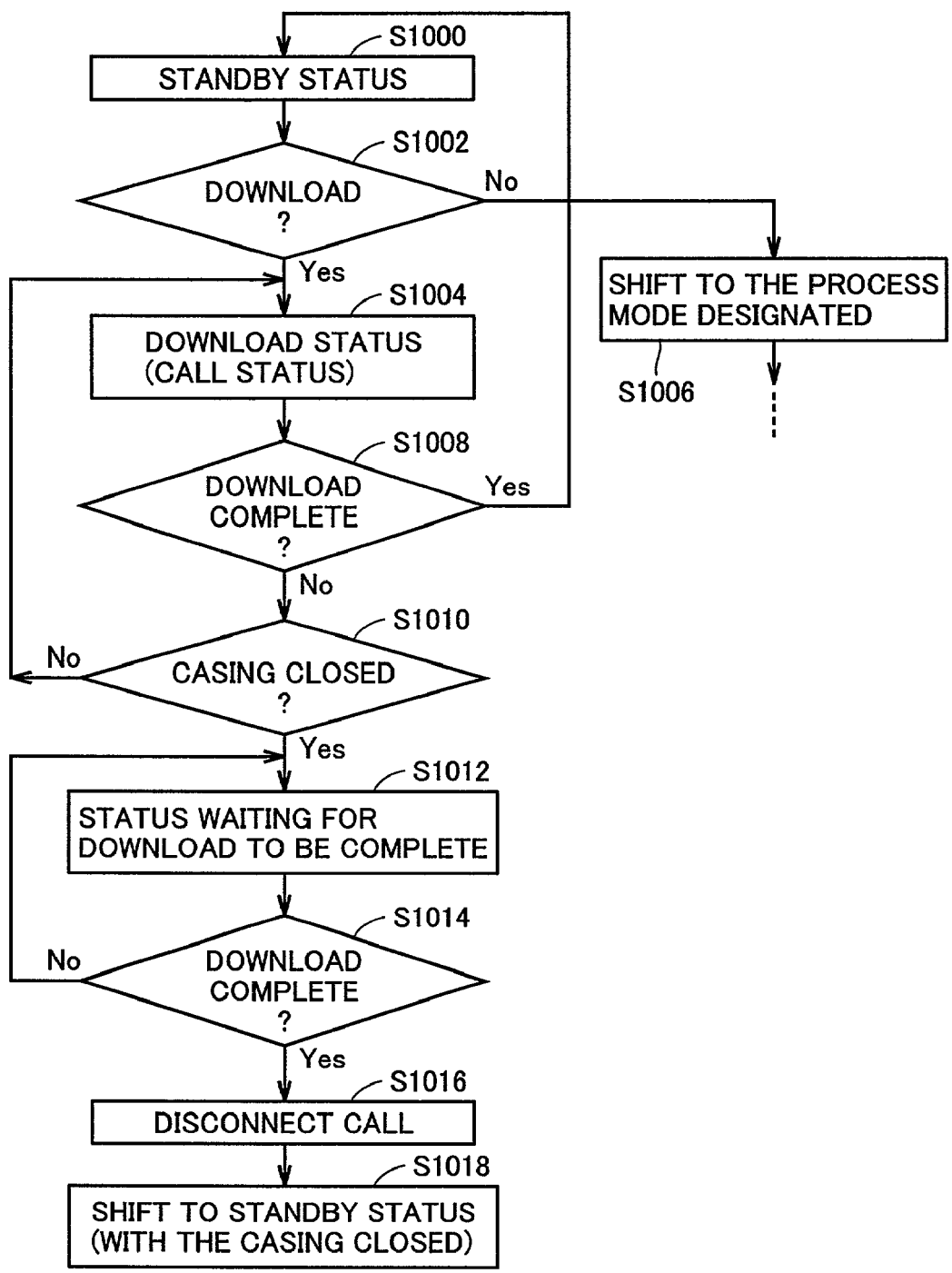
FIG. 13 is a flow chart representing a relationship between opened and closed positions of a casing of a cellular phone in the form of a shell in the first embodiment and a download process.

Reference will now be made to FIG. 13 to more specifically describe a relationship between opened and closed positions of the casing of cellular phone 100 in the form of the shell in the first embodiment, and a download process.

Initially, cellular phone 100 has the casing in an opened position and it also has a standby status (step S1000). In this condition, the control determines whether a download process is designated to record requested content data in memory card 110 (step S1002). If so and the authenticity of the request for the distribution is also confirmed, cellular phone 100 is conferred a download or call status on (step S1004). If for example a reproduction mode or any other process mode than the download process is designated then the mode as designated is set (step S1006).

The amount of data distributed or the like is monitored by controller 1106 to determine whether the downloading has completed (step S1008).

If the control determines that the downloading has completed, cellular phone 100 is again conferred the standby status on (step S1000).

If the control determines that the downloading still continues, detection unit 1117 determines whether the casing of cellular phone 100 has been closed (step S1010).

If not then the download status is held (step S1004).

If the casing is closed, the cellular phone is conferred a status on to continue a download process until the current downloading completes (step S1012). With this status, power supply control unit 1116 continues to supply each circuit with a power supply voltage required for the call.

Then the amount of data distributed or the like is monitored by controller 1106 to determine whether the downloading has completed (step S1014).

If not then the cellular phone is conferred the aforementioned status on to wait for the current downloading to complete (step S1012).

If the control determines that the downloading has completed, the call is disconnected (step S1016).

Then the cellular phone is conferred a standby status on with the casing closed, when power supply control unit 1116 controls cellular phone 100 to enter a low power consumption mode, a mode minimizing power consumption.

Figure 14:
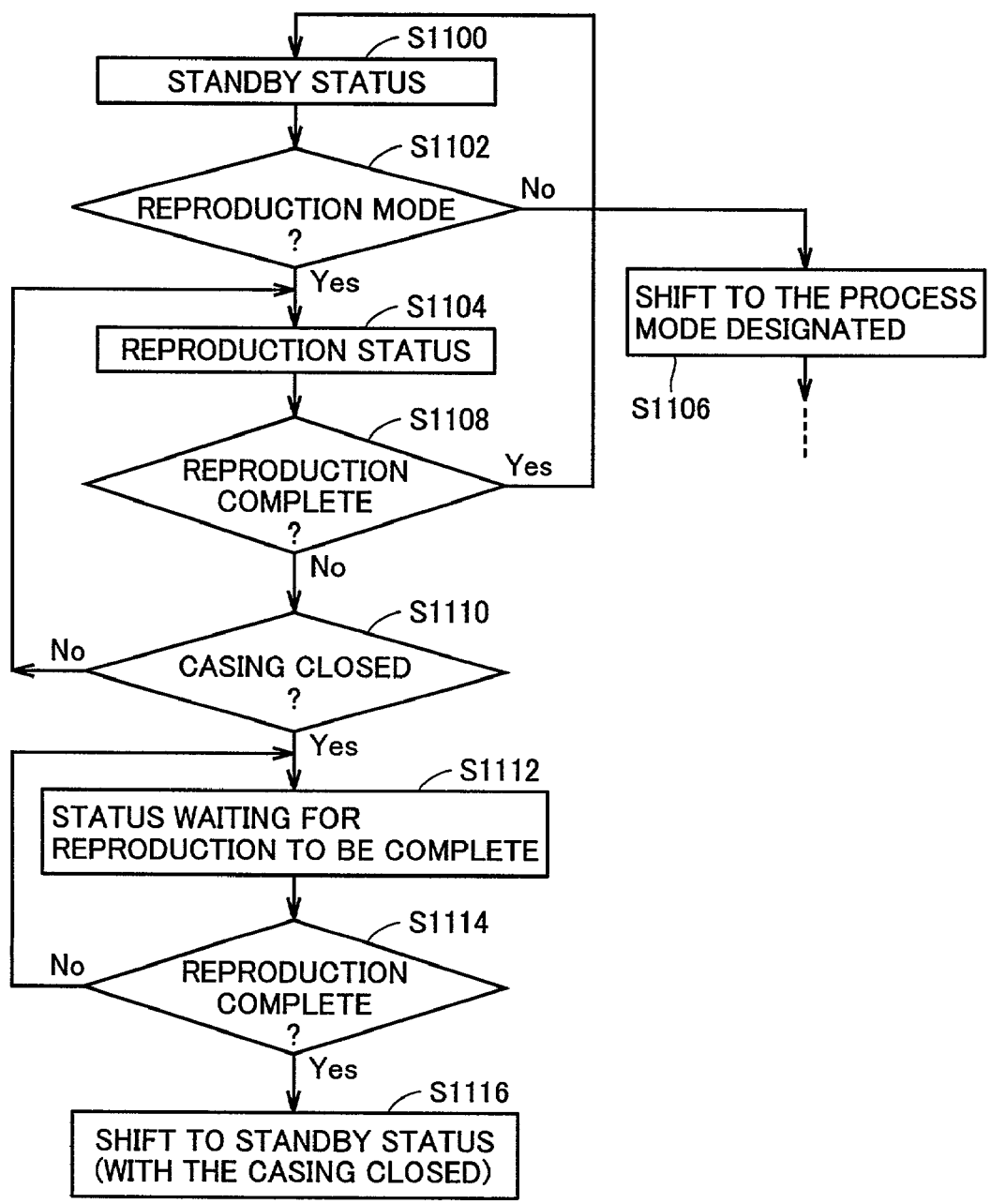
FIG. 14 is a flow chart representing a relationship between the opened and closed positions of the casing of cellular phone in the form of the shell in the first embodiment and a reproduction process.

Reference will now be made to FIG. 14 to more specifically describe a relationship between the opened and closed positions of the casing of cellular phone 100 in the form of the shell in the first embodiment, and a data reproduction process. Memory card 110 is assumed to have recorded therein content data to be reproduced.

Initially, cellular phone 100 has the casing in an opened position and it also has a standby status (step S100). In this condition, the control determines whether a reproduction mode is designated to reproduce the content data (step S1102). If so then cellular phone 100 is conferred a reproduction status on to reproduce content data designated (step S1104). If a process mode other than the reproduction mode is designated, such as a download process, then the mode as designated is set (step S1106).

Once a reproduction process starts, controller 1106 determines whether the reproduction has completed (step S1108).

If so then the cellular phone is again conferred the standby status on (step S1100).

If the reproduction still continues, detection unit 1117 determines whether the casing of cellular phone 100 has been closed (step S1110).

If not then the reproduction status is held (step S1104).

If the casing has been closed, then the cellular phone is conferred a status on to continue the reproduction process until the content data is completely reproduced (step S1112). With this status, power supply control unit 1116 continues to supply each circuit with a power supply voltage required for the reproduction process.

Then controller 1106 determines whether the reproduction has completed (step S1114).

If not then the cellular phone is conferred the aforementioned status on to continue the reproduction process until the content data is completely reproduced (step S1112).

If the control determines that the reproduction has completed, then the cellular phone is conferred a standby status on with the casing closed, when power supply control unit 1116 controls cellular phone 100 to enter a low power consumption mode, a mode minimizing power consumption.

In the first embodiment the cellular phone can reproduce encrypted content data while the copyright of the data can sufficiently be protected.

Furthermore if its case in the form of the shell is closed while data is being downloaded, cellular phone 100 can complete downloading the data. In particular, it is no longer necessary to leave the cellular phone with its casing open to download a large amount of data such as music content. Furthermore, if its casing is closed while music is being reproduced, cellular phone 100 still can continue to reproduce the music.

Second Embodiment

A second embodiment describes another exemplary configuration of cellular phone 100 of the first embodiment. Note that the present embodiment employs a data distribution system, license server and memory card having the configuration as has been described in the first embodiment.

Figure 15:
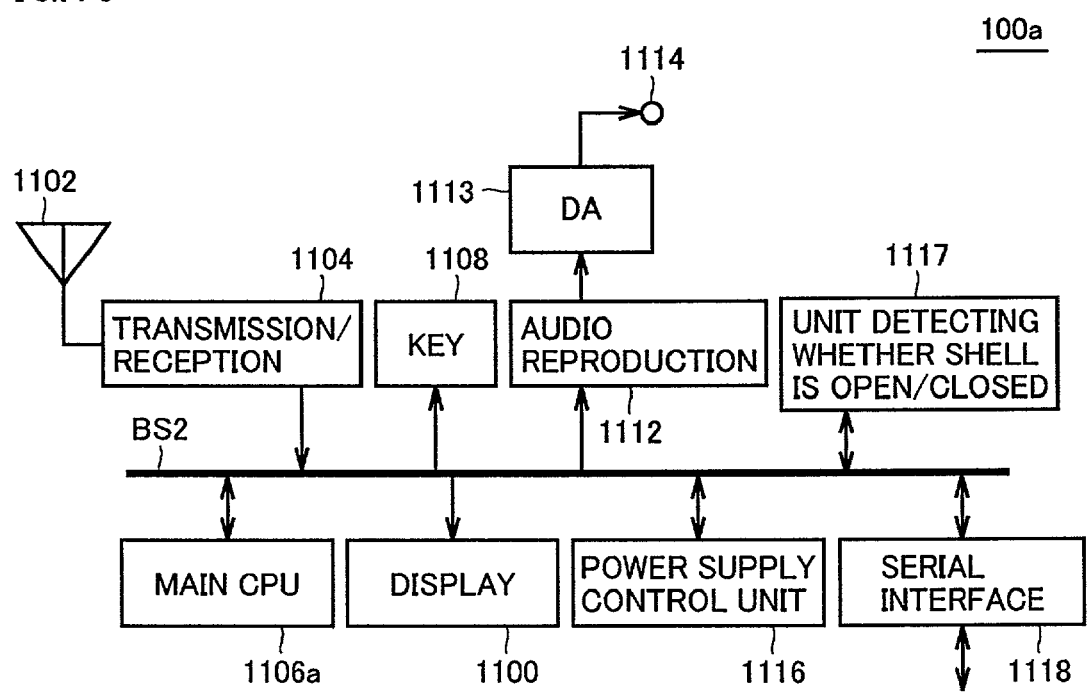
FIG. 15 is a block diagram showing a configuration of a main body of a cellular phone in a second embodiment.
Figure 16:
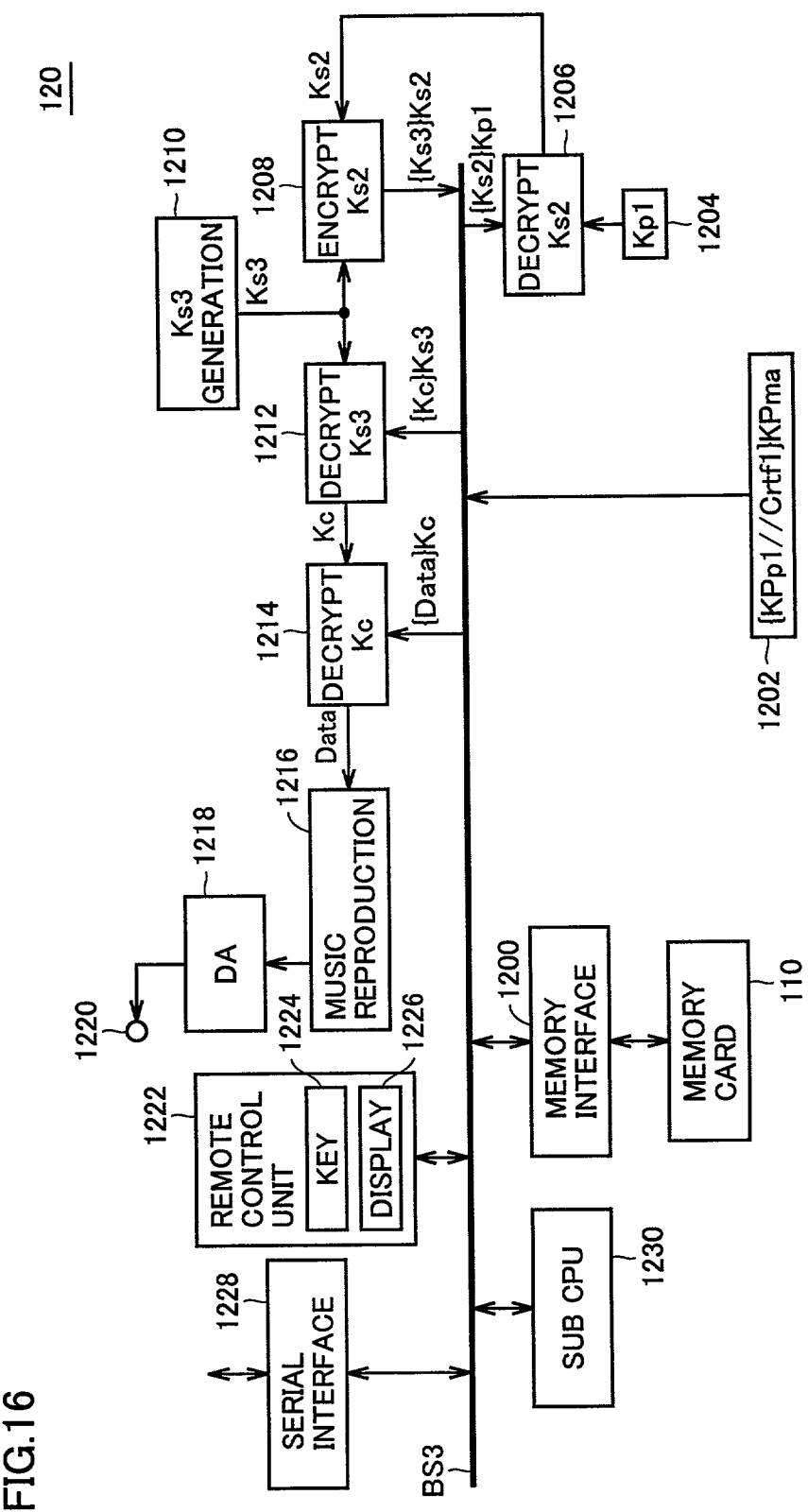
FIG. 16 is a block diagram showing a configuration of a music reproduction module in the second embodiment.

The second embodiment provides a cellular phone having a circuit separated into communication process system circuitry and a reproduction system. More specifically, a communication function is provided to a main body of the cellular phone, configured as shown in FIG. 15, which will be referred to as a main body 100a of the cellular phone. Separated from main body 100a, a music reproduction module 120 is provided, as shown in FIG. 16. Controller 1106 is separated into a main CPU 1106a of main body 100a and a sub CPU 1230 of audio reproduction module 120.

Main body 100a and audio reproduction module 120 are both incorporated into the casing in the form of the shell as described above. They may be separated as of a remote control type and in that case, for example as shown in FIG. 16, a remote control unit 1222 may be employed, with a key operation unit 1224 and a display 1226 included.

With reference to FIG. 15, main body 100a includes an antenna 1102, a transmission and reception unit 1104, a data bus BS2, a main CPU 1106a controlling a circuit operation of main body 100a via data bus BS2, a key operation unit 1108, a display 1100, an audio reproduction unit 1112, a DA converter 1113, and a terminal 1114 receiving an output of the DA converter.

Main body 100a also includes a power supply control unit 1116, a detection unit 1117 detecting whether the shell is open or closed, and a serial interface 1118. Via serial interface 1118 main body 100*a* communicates data with audio reproduction module 120.

As has been described previously, detection unit 1117 detects whether the casing in the form of the shell enclosing main body 100*a* and audio reproduction module 120 has an opened position or a closed position. Detection unit 1117 outputs a result which is in turn transferred to main CPU 1106*a* on data bus BS2. Power supply control unit 1116 is controlled by main CPU 1106*a* to supply main body 100*a* and/or audio reproduction module 120 with an operating power supply.

With reference to FIG. 16, audio reproduction module 120 includes an authentication data hold unit 1202, a Kp1 hold unit 1204, decryption units 1206, 1212 and 1214, an encryption unit 1208, a session key generation unit 1210, a music reproduction unit 1216, a DA converter 1218, a connection terminal 1220, and a serial interface 1228.

Audio reproduction module 120 also includes a data bus BS3, a sub CPU 1230 controlling an operation of audio reproduction module 120, a memory card 110, and a memory interface 1200 arranged between memory card 110 and data bus BS3. Via serial interface 1228, audio reproduction module 120 communicates data with cellular phone 100*a*.

The opened and closed positions of the casing in the form of the shell and a process effected to download content data, have the relationship as has been described in the first embodiment. Furthermore, the opened and closed positions of the casing and a process effected to reproduce content data has the relationship as has been described in the first embodiment.

Thus the second embodiment can also provide a cellular phone, having a communication process system and a reproduction process system separated from each other, that is as effective as the first embodiment.

Third Embodiment

Figure 17:
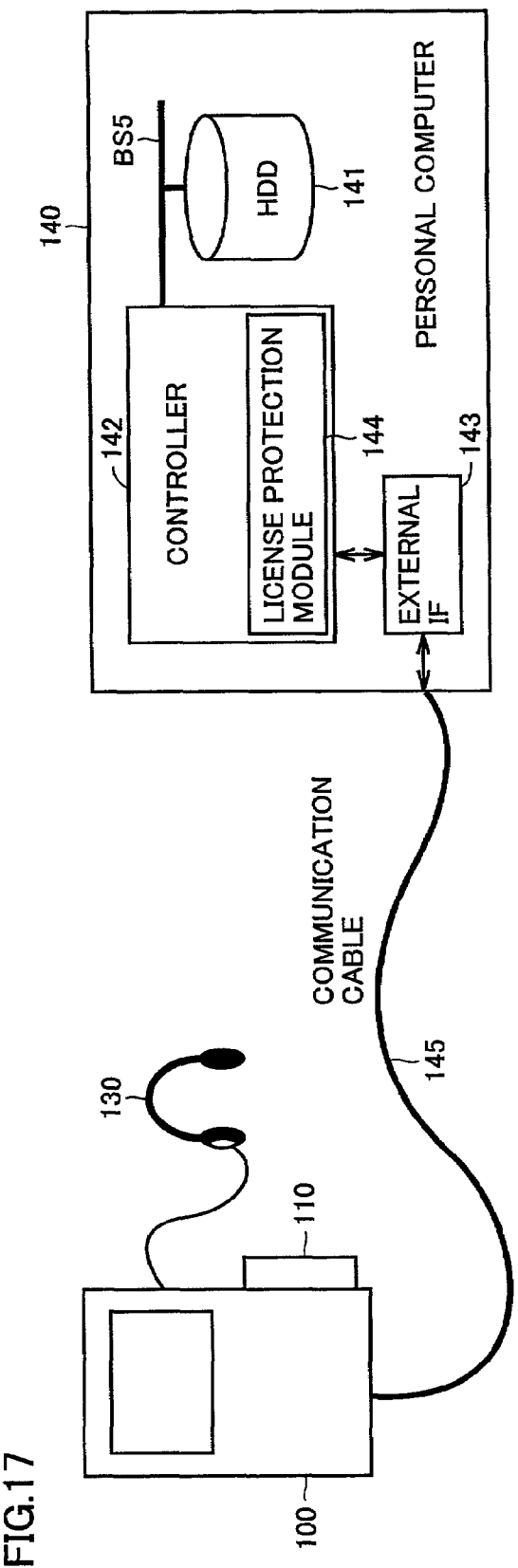
FIG. 17 is a schematic diagram for illustrating a concept of distributing encrypted content data by means of a computer.
Figure 18:
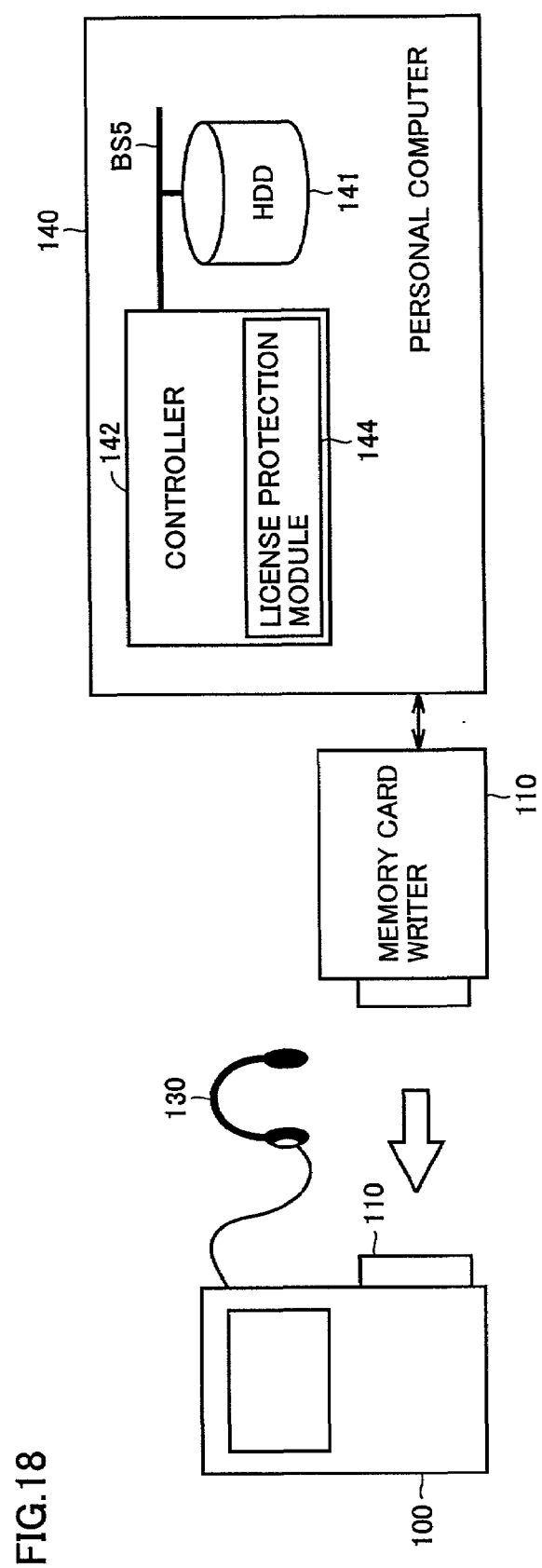
FIG. 18 is another schematic diagram for illustrating a concept of distributing encrypted content data by means of a computer.
Figure 19:
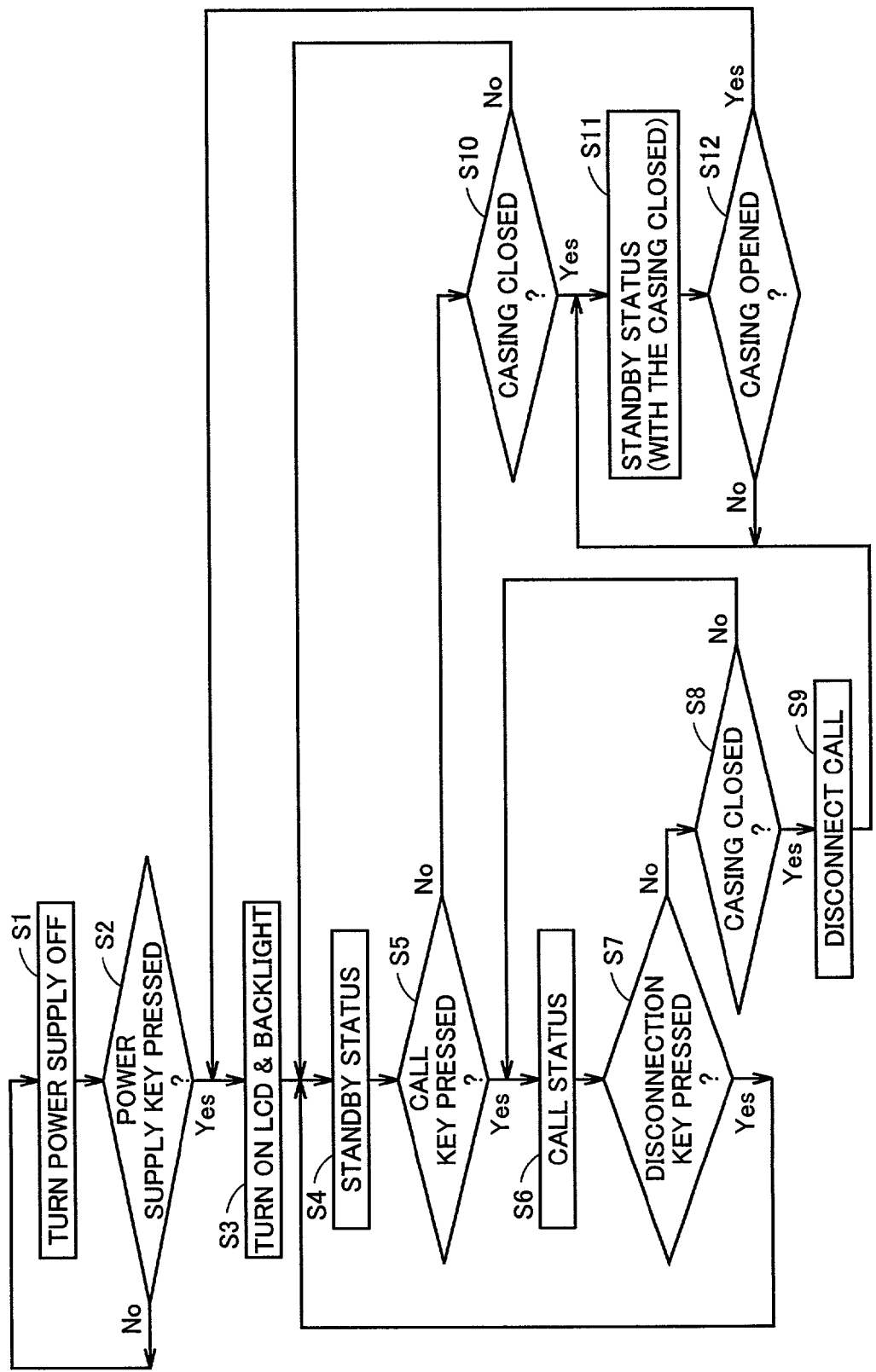
FIG. 19 is a flow chart for illustrating a power supply to a conventional cellular phone in the form of a shell.

Reference will now be made to FIGS. 17 and 18 to describe a third embodiment of the present invention. Cellular phone 100 can receive new encrypted content data {Data}Kc from memory card 110 attached to another cellular phone 100. In doing so, it issues a request to distribution server 30 to receive license key Kc corresponding to encrypted content data {Data}Kc. In the third embodiment, cellular phone 100 receives encrypted content data {Data}Kc for example distributed on the Internet via a computer and records the received encrypted content data in memory card 110 and requests distribution server 30 to distribute license key Kc corresponding to the encrypted content data, as will exemplarily be described hereinafter.

With reference to FIG. 17, encrypted content data {Data}Kc is distributed via a computer 140, as will now be described. Cellular phone 100 allows memory card 110 to be detachably attached thereto and it has headphone 130 connected thereto for reproducing music. Furthermore, cellular phone 100 is connected to computer 140 via a communication cable 145.

Computer 140 includes a hard disk 141, a controller 142, and an external interface 143. Hard disk 141 is connected to controller 142 via data bus BS5. Controller 142 includes a license protection module 144.

Hard disk 141 stores via data bus BS5 encrypted content data {Data}Kc distributed on the Internet to computer 140. When controller 142 receives a request from user 1 of cellular phone 100 via communication cable 145 and external interface 143 to transmit encrypted content data {Data}Kc, controller 142 reads encrypted content data {Data}Kc from hard disk 141 and outputs the data externally via external interface 143.

External interface 143 inputs to controller 142 a signal input to computer 140 from cellular phone 100 via communication cable 145 and it also externally outputs a signal received from controller 142.

License protection module 144 has a configuration identical to that of the FIG. 6 data processing unit 310 and, to transmit encrypted content data {Data}Kc to memory card 110 attached to cellular phone 100, communicates public encryption keys, session keys and the like with cellular phone 100 and memory card 110, as has been described previously, while protecting and thus transmitting encrypted content data {Data}Kc to memory card 110.

On the Internet from distribution server 30 to computer 140 encrypted content data {Data}Kc is distributed and stored at hard disk 141 in computer 140 via data bus BS5.

When user 1 of cellular phone 100 operates key operation unit 1108 to input a request for transmission, the request for transmission is input to controller 142 via communication cable 145 and external interface 143. When controller 142 receives the request for transmission, controller 142 reads requested, encrypted content data {Data}Kc from hard disk 141 via data bus BS5 and inputs it to license protection module 144.

As has been described previously, license protection module 144 communicates public encryption keys, session keys and the like with memory card 110 via communication cable 145 and transmits encrypted content data {Data}Kc to memory card 110.

After the transmission, user 1 of cellular phone 100 have distribution server 30 to distribute license key Kc for encrypted content data {Data}Kc, as has been described previously, and reproduces encrypted content data {Data}Kc.

Furthermore, computer 140 is not limited to receiving encrypted content data {Data}Kc distributed on the Internet, and it may also read encrypted content data {Data}Kc recorded on a CD-ROM set in a CD-ROM drive (not shown) connected to computer 140 and transmit the data to memory card 110. Furthermore, encrypted content data {Data}Kc recorded on the CD-ROM may once be stored on hard disk 141.

Furthermore, computer 140 may produce encrypted content data {Data}Kc by CD-ripping. "Ripping" means converting music data obtained from a music CD, so as to be reproducible by a music reproduction module. Initially, a license is produced for music data obtained. Then the obtained music data is converted to content data reproducible by music reproduction unit 1216 and it is then encrypted to be decryptable with a license key included in the produced license. The license produced to decrypt encrypted content data obtained by ripping, is managed to be non-replicable. Thus, the CD-ripping, corresponding to a primary replication from a music CD, is a legal activity protecting a copyright by encrypting content and providing a non-replicable license including a license key corresponding to a key used to decrypt the encrypted content.

If a CD is used, encrypted content data {Data}Kc obtained from a music CD and generated may once be recorded on hard disk 141 and thereafter transmitted to memory card 110 or it may not be recorded on hard disk 141 and instead directly be transmitted to memory card 110.

Encrypted content data {Data}Kc may be recorded directly in memory card 110 attached to computer 140, as shown in FIG. 18. In this case, controller 142 of computer 140 records encrypted content data directly in memory card 110 via license protection module 144.

In FIG. 18, computer 140 also obtains encrypted content data {Data}Kc by a method identical to that shown in FIG. 17.

Cellular phone 100 requests distribution server 30 to distribute license key Kc corresponding to encrypted content data {Data}Kc additionally received and it reproduces the additionally received encrypted content data {Data}Kc, as represented in the flow charts referred to in the first embodiment.

In the third embodiment when a cellular phone receives additional encrypted content data on the Internet, by CD-ripping or the like, it automatically issues a request to a distribution server to receive a license key decrypting the encrypted content data. As such, if a user of the cellular phone receives only encrypted content data distributed for example on the Internet it can reproduce the encrypted content data.

Note that while in the above description a cellular phone in the form of a shell is referred to by way of example, the present invention is not limited thereto and it is also applicable to any data terminal devices that do not receive power supply when the flap is flipped closed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data terminal device accommodated in a casing in a form of a shell, downloading from a distribution server encrypted content data and a license key decrypting said encrypted content data, and reproducing said encrypted content data, comprising:

a communication unit externally effecting a communication;

a data recording device recording said encrypted content data and said license key therein, and receiving authentication data and outputting said license key only when said authentication data is authenticated;

an interface controlling data communication;

a control unit;

a detection unit detecting whether said casing is open/closed; and a power supply control unit controlling whether to supply various components with power, wherein when said detection unit detects that said casing is closed after download of said encrypted content data is started, said power supply control unit controls supplying power required for a call to complete downloading said encrypted content data.

2. The data terminal device of claim 1, wherein when the data terminal device with said casing closed completes downloading said encrypted content data, said power supply control unit for example stops supplying said power and controls a standby mode function of said various components internal to the data terminal device to shift the data terminal device to a low power consumption mode.

3. A data terminal device accommodated in a casing in a form of a shell, downloading from a distribution server encrypted content data and a license key decrypting said encrypted content data, and reproducing said encrypted content data, comprising:

a communication unit externally effecting a communication;

a data recording device recording said encrypted content data and said license key therein, and receiving authentication data and outputting said license key only when said authentication data is authenticated;

a reproduction unit reproducing said encrypted content data recorded in said data recording device;

an interface controlling data communication;

a control unit;

a detection unit detecting whether said casing is open/closed; and a power supply control unit controlling whether to supply various components with power, wherein when said detection unit detects that said casing is closed after reproduction of said encrypted content data is started, said power supply control unit controls supplying power required for a reproduction process to complete reproducing said encrypted content data.

4. The data terminal device of claim 3, wherein when the data terminal device with said casing closed completes reproducing said encrypted content data, said power supply control unit for example stops supplying said power and controls a standby mode function of said various components internal to the data terminal device to shift the data terminal device to a low power consumption mode.

5. A data terminal device accommodated in a casing in a form of a shell, downloading from a distribution server encrypted content data and a license key decrypting said encrypted content data, recording said encrypted content data and said license key in a data recording device, and reproducing said encrypted content data via said data recording device, comprising:

a communication unit externally effecting a communication;

an interface controlling data communication;

a control unit;

a detection unit detecting whether said casing is open/closed; and a power supply control unit controlling whether to supply various components with power, wherein when said detection unit detects that said casing is closed after download of said encrypted content data is started, said power supply control unit controls supplying power required for a call to complete downloading said encrypted content data.

6. The data terminal device of claim 5, wherein when the data terminal device with said casing closed completes downloading said encrypted content data, said power supply control unit for example stops supplying said power and controls a standby mode function of said various components internal to the data terminal device to shift the data terminal device to a low power consumption mode.

7. A data terminal device accommodated in a casing in a form of a shell, downloading from a distribution server encrypted content data and a license key decrypting said encrypted content data, recording said encrypted content data and said license key in a data recording device, and reproducing said encrypted content data via said data recording device, comprising:

a communication unit externally effecting a communication;

an interface controlling data communication;

a control unit;

a reproduction unit reproducing said encrypted content data recorded in said data recording device;

a detection unit detecting whether said casing is open/closed; and a power supply control unit controlling whether to supply various components with power, wherein when said detection unit detects that said casing is closed after reproduction of said encrypted content data is started, said power supply control unit controls supplying power required for a reproduction process to complete reproducing said encrypted content data.

8. The data terminal device of claim 7, wherein when the data terminal device with said casing closed completes reproducing said encrypted content data, said power supply control unit for example stops supplying said power and controls a standby mode function of said various components internal to the data terminal device to shift the data terminal device to a low power consumption mode.

* * * * *